United States Patent
Francois et al.

(10) Patent No.: US 11,748,844 B2
(45) Date of Patent: Sep. 5, 2023

(54) SYSTEMS AND METHODS FOR GENERATING A VIRTUAL DISPLAY OF AN ITEM

(71) Applicant: Carvana, LLC, Tempe, AZ (US)

(72) Inventors: Bruno Jean Marie Francois, Atlanta, GA (US); Remy Cilia, Atlanta, GA (US); Grant Schindler, Atlanta, GA (US)

(73) Assignee: Carvana, LLC, Tempe, AZ (US)

( * ) Notice: Subject to any disclaimer, the term of this patent is extended or adjusted under 35 U.S.C. 154(b) by 288 days.

(21) Appl. No.: 17/145,076

(22) Filed: Jan. 8, 2021

(65) Prior Publication Data

US 2021/0209729 A1     Jul. 8, 2021

Related U.S. Application Data

(60) Provisional application No. 62/958,462, filed on Jan. 8, 2020.

(51) Int. Cl.
    *G06T 3/40*     (2006.01)
    *H04N 13/117*     (2018.01)
    *G06Q 30/0601*     (2023.01)
    *G06T 5/50*     (2006.01)

(52) U.S. Cl.
    CPC ........ *G06T 3/4038* (2013.01); *G06Q 30/0643* (2013.01); *G06T 5/50* (2013.01); *H04N 13/117* (2018.05)

(58) Field of Classification Search
CPC ..... G06T 3/4038; G06T 5/50; G06Q 30/0643; H04N 13/117; H04N 5/232; H04N 5/247
See application file for complete search history.

(56) References Cited

U.S. PATENT DOCUMENTS

| | | | |
|---|---|---|---|
| 5,694,533 A | 12/1997 | Richards | |
| 5,973,733 A | 10/1999 | Gove | |
| 6,901,384 B2 | 5/2005 | Lynch et al. | |
| 6,950,807 B2 | 9/2005 | Brock | |
| 7,119,837 B2 | 10/2006 | Soupliotis et al. | |

(Continued)

FOREIGN PATENT DOCUMENTS

| | | | | |
|---|---|---|---|---|
| JP | 2006224927 A | * | 8/2006 | ............... B60R 1/00 |
| JP | 4971615 B2 | * | 7/2012 | ............... A61B 1/04 |

OTHER PUBLICATIONS

In re Venner et al., No. 6391, LexisNexis; United States Court of Customs and Patent Appeals; Oral Argument Nov. 7, 1958 Dec. 19, 1958.

(Continued)

*Primary Examiner* — Mekonen T Bekele
(74) *Attorney, Agent, or Firm* — Snell & Wilmer, L.L.P.

(57) ABSTRACT

Systems and methods including one or more processors and one or more non-transitory storage devices storing computing instructions configured to run on the one or more processors and perform: capturing two or more images of an item in a sequence; extracting one or more groups of images from the two or more images of the item in the sequence; converting at least one group of the one or more groups of images into a video file; and coordinating displaying, on a user electronic device of a user, a virtual display of the item, the virtual display of the item comprising the video file. Other embodiments are disclosed herein.

20 Claims, 16 Drawing Sheets

(56) References Cited

U.S. PATENT DOCUMENTS

| | | |
|---|---|---|
| 7,149,345 B2 | 12/2006 | Fujiwara |
| 7,272,255 B2 | 9/2007 | Ishiyama |
| 7,394,977 B2 | 7/2008 | Park et al. |
| 7,433,497 B2 | 10/2008 | Chen |
| 7,548,236 B2 | 6/2009 | Ikezawa |
| 7,548,659 B2 | 6/2009 | Ofek et al. |
| 7,557,832 B2 | 7/2009 | Lindenstruth et al. |
| 7,558,405 B2 | 7/2009 | Tico et al. |
| 7,605,845 B2 | 10/2009 | Batur |
| 7,705,885 B2 | 4/2010 | Prieto et al. |
| 7,817,181 B2 | 10/2010 | Lee |
| 8,054,335 B2 | 11/2011 | Deng et al. |
| 8,072,496 B2 | 12/2011 | Antsfeld |
| 8,134,603 B2 | 3/2012 | Auberger et al. |
| 8,194,141 B2 | 6/2012 | Narasimha et al. |
| 8,385,732 B2 | 2/2013 | Zuniga et al. |
| 8,488,010 B2 | 7/2013 | Voss et al. |
| 8,494,058 B2 | 7/2013 | Chang et al. |
| 8,508,605 B2 | 8/2013 | Dolgin et al. |
| 8,520,084 B2 | 8/2013 | Tsai et al. |
| 8,531,535 B2 | 9/2013 | Kwatra |
| 8,553,096 B2 | 10/2013 | Proca et al. |
| 8,558,903 B2 | 10/2013 | Wu et al. |
| 8,648,919 B2 | 2/2014 | Mantzel et al. |
| 8,743,222 B2 | 6/2014 | Hamalainen |
| 8,773,542 B2 | 7/2014 | Jiang et al. |
| 8,797,414 B2 | 8/2014 | Park et al. |
| 8,872,927 B2 | 10/2014 | Proca et al. |
| 8,890,962 B2 | 11/2014 | Proca et al. |
| 8,896,713 B2 | 11/2014 | Corey et al. |
| 8,923,400 B1 | 12/2014 | Alvarez et al. |
| 8,941,743 B2 | 1/2015 | Petrescu |
| 8,947,546 B2 | 2/2015 | Foster et al. |
| 9,300,871 B2 | 3/2016 | Zhou et al. |
| 9,300,873 B2 | 3/2016 | Zhou et al. |
| 9,525,821 B2 | 12/2016 | Chang |
| 9,596,411 B2 | 3/2017 | Thivent |
| 9,609,209 B2 | 3/2017 | Lee et al. |
| 9,998,663 B1 | 6/2018 | Francois |
| 10,192,122 B2 | 1/2019 | Yoshida et al. |
| 10,284,794 B1 | 5/2019 | Francois et al. |
| 2002/0082860 A1 | 6/2002 | Johnson |
| 2002/0085219 A1 | 7/2002 | Ramamoorthy |
| 2002/0105513 A1 | 8/2002 | Chen |
| 2007/0011083 A1 | 1/2007 | Bird et al. |
| 2007/0076982 A1 | 4/2007 | Petrescu |
| 2007/0171987 A1 | 7/2007 | Trimeche |
| 2007/0172216 A1 | 7/2007 | Lai |
| 2007/0248167 A1 | 10/2007 | Park et al. |
| 2008/0143840 A1 | 6/2008 | Corkum et al. |
| 2008/0165280 A1 | 7/2008 | Deever et al. |
| 2009/0066800 A1 | 3/2009 | Wei |
| 2009/0140887 A1 | 6/2009 | Breed et al. |
| 2009/0160930 A1 | 6/2009 | Ruppert |
| 2009/0167844 A1 | 7/2009 | Seki et al. |
| 2009/0169052 A1 | 7/2009 | Seki et al. |
| 2010/0046624 A1 | 2/2010 | Archibald et al. |
| 2010/0208086 A1 | 8/2010 | Kothandaraman et al. |
| 2013/0033612 A1 | 2/2013 | Wu et al. |
| 2013/0215264 A1 | 8/2013 | Soatto et al. |
| 2013/0307937 A1 | 11/2013 | Kim |
| 2013/0335409 A1 | 12/2013 | Yamamoto |
| 2014/0037136 A1 | 2/2014 | Ramalingam et al. |
| 2014/0198852 A1 | 7/2014 | Incesu et al. |
| 2014/0201126 A1 | 7/2014 | Zadeh et al. |
| 2014/0232748 A1 | 8/2014 | Kis et al. |
| 2015/0022677 A1 | 1/2015 | Guo et al. |
| 2015/0084951 A1 | 3/2015 | Boivin et al. |
| 2016/0028967 A1 | 1/2016 | Sezer et al. |
| 2016/0088287 A1 | 3/2016 | Sadi et al. |
| 2016/0127641 A1 | 5/2016 | Gove |
| 2016/0328827 A1 | 11/2016 | Ilic et al. |
| 2020/0082504 A1 | 3/2020 | Saporta et al. |

OTHER PUBLICATIONS

Credit Acceptance Corp, Guaranteed Credit Approval, Auto Loan; http://www.insider-car-buying-tips.com/credit_acceptance_corp.html; accessed Dec. 17, 2013 Dec. 17, 2013.

Auto Success; Credit Acceptance's Upgraded Credit Approval Processing System Simplifies Approval Process; vol. 1 Issue 33; http://www.imakenews.com/autosuccess/e_article001075242.cfm?x=bgB6Vlj,b7jJcq29.w; accessed Dec. 17, 2013 Dec. 17, 2013.

Credit Acceptance Corp (CACC.OQ) Company Profile | Reuters.com; http://.reuters.com/finance/stocks/companyProfile?symbol=CACC.OQ; accessed Dec. 17, 2013 Dec. 17, 2013.

Credit Acceptance Corporation—Annual Report; United States Securities and Exchange Commission; Washington D. C. 20549; Form 10-K; Annual Report Pursuant to Section 13 or 15(d) of the Securities Exchange Act of 1934. http://www.ir.creditacceptance.com/secfiling.cfm?filingID=885550-13-18&CIK=885550; Accessed Dec. 17, 2013 Dec. 17, 2013.

* cited by examiner

FIG. 4A

FIG. 4B

SYSTEMS AND METHODS FOR GENERATING A VIRTUAL DISPLAY OF AN ITEM

CROSS-REFERENCE TO RELATED APPLICATIONS

This application claims the benefit of U.S. Provisional No. 62/958,462, filed Jan. 8, 2020, which is herein incorporated by this reference in its entirety.

BACKGROUND

Shopping online for an item, while highly convenient, poses challenges for both buyer and seller. If the buyer is unable to inspect the item, the buyer can lack confidence to purchase the item. Sellers typically provide photographs or videos of the item to provide potential buyers with a representation of the item. However, as numerous online sellers have discovered, any delay or inconvenience in the online experience, such as a significant delay in a website loading, a delay or error in the purchase process, or a delay in the loading of photos or other representations of the item, can cause the potential buyer not to complete the purchase.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

FIGS. 4A and 4B illustrate a plurality of images of an item that can be captured as part of a method of generating a virtual display.

DETAILED DESCRIPTION

Figure 1:
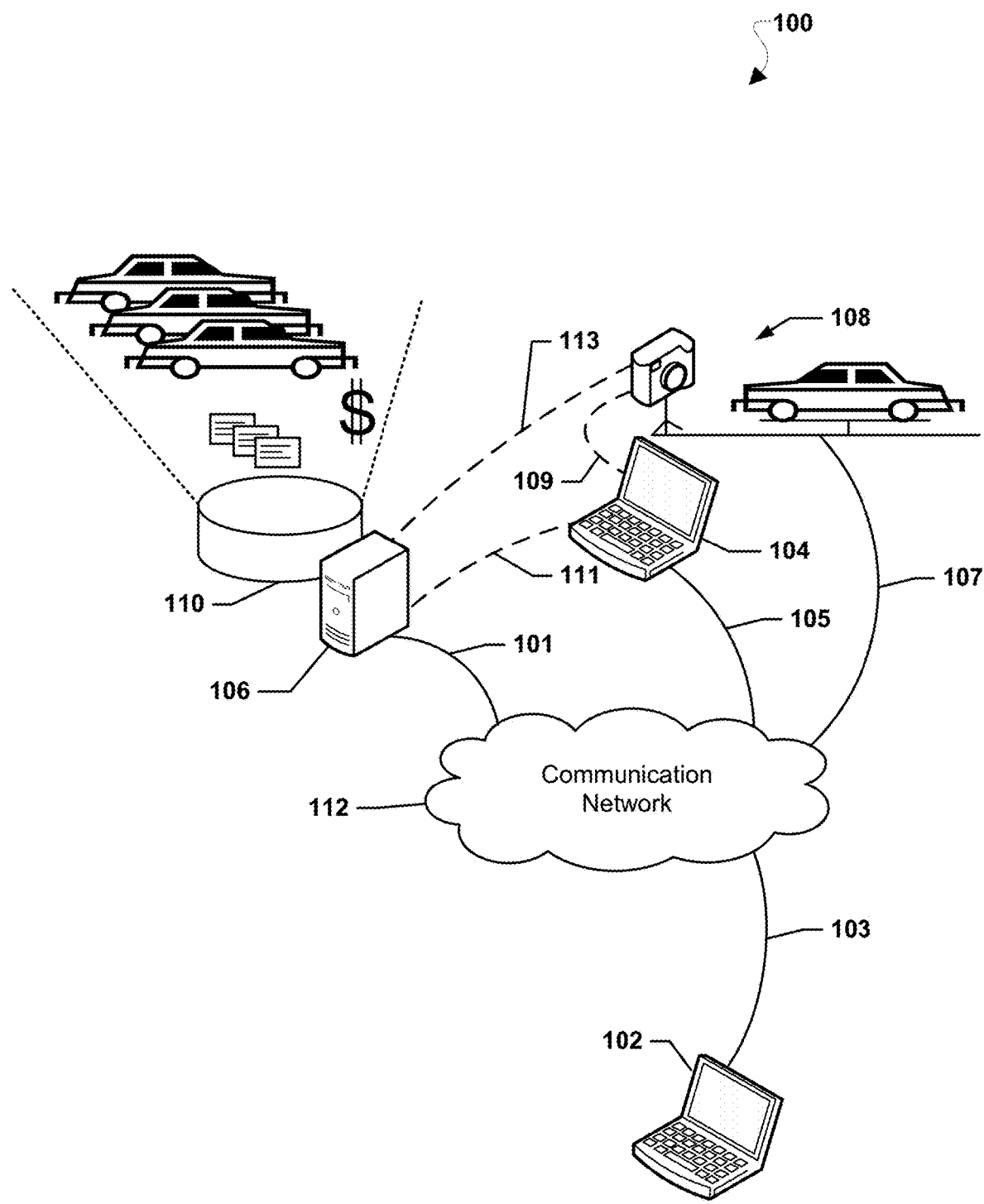
FIG. 1 is a communication system block diagram of a network suitable for use with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, the term "computing device" is used to refer to any one or all of desktop computers, cellular telephones, smart phones, personal or mobile multi-media players, personal data assistants (PDAs), laptop computers, tablet computers, smart books, retail terminals, palm-top computers, wireless electronic mail receivers, multimedia Internet enabled cellular telephones, wireless gaming controllers, and similar electronic devices which include a programmable processor and memory and circuitry for receiving user input and rendering data, such as web pages, images, etc.

The various embodiments are described herein using the term "network element." The term "network element" refers to any computing device that can be configured to provide a service, host an application, provide data, and other similar functions, such as a server device (e.g., a master exchange server, web server, mail server, document server, or any other type of server). A network element can be a dedicated computing device or a computing device including a server module (e.g., running an application which can cause the computing device to operate as a server). A server module (e.g., server application) can be a full function server module or a light or secondary server module (e.g., light or secondary server application) that is configured to provide synchronization services among the dynamic databases on computing devices. A light server or secondary server can be a slimmed-down version of server type functionality that can be implemented on a computing device, such as a smart phone, thereby enabling it to function as an Internet server (e.g., an enterprise e-mail server) only to the extent necessary to provide the functionality described herein.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

Shopping online for an item, while highly convenient, poses challenges for both buyer and seller. If the buyer is unable to inspect the item, the buyer can lack confidence to purchase the item. Sellers typically provide photographs or videos of the item to provide potential buyers with a representation of the item. However, as numerous online sellers have discovered, any delay or inconvenience in the online experience, such as a significant delay in a website loading, a delay or error in the purchase process, or a delay in the loading of photos or other representations of the item, can cause the potential buyer not to complete the purchase. Potential buyers can respond positively to viewing high resolution photographs or video that show a large amount of detail of the item. However, such electronic files of high resolution photographs or video can include a large amount of data, which can incur network transport latency, and thus can appear to load slowly at the destination computing device.

The systems, methods, and devices of the various embodiments enable virtual displays of an item, such as a vehicle, to be quickly and efficiently provided to a computing device for rapid presentation by the computing device (e.g., to a user). In one or more embodiments, a network device can capture a plurality of images of an item, each from a different position around the item. In many embodiments, a network device can capture the plurality of images of an item in a sequence. For example, a network device can capture a plurality of images using a camera or cameras that are moved around an item to capture images from multiple viewpoints. As another example, a network device can capture a plurality of images using a plurality of cameras positioned around an item. As further example, an item itself can be rotated and a network device can capture a plurality of images showing different views of the item.

In some embodiments, a network device can encode each of a plurality of images with information indicating a place of each image in the sequence. Such information can include, for example, a letter, a number, a symbol, or representation of a letter, number, or symbol indicating a place of each image in a sequence. An example of a representation of a letter, number, or symbol can include any form of encoding, such as a barcode, QR code, or another suitable encoding form.

In some embodiments, a network device can reorder a plurality of images out of a sequence such that a first group of images shows an item from different viewpoints around the item. For example, a network device can reorder images such that a first eight images of a reordered plurality of images shows an item from eight distinct viewpoints (e.g., front, left-front, left side, left-rear, rear, right-rear, right side, and right-front). In some embodiments, a network device can reorder a plurality of images such that a second group of images that follows a first group of images shows an item from a different second set of viewpoints around the item. In some embodiments, a second set of viewpoints are interspersed between first viewpoints. For example, a second set of viewpoints can include viewpoints that are between front and left-front, left-front and left side, left side and left-rear, left-rear and rear, rear and right-rear, right rear and right side, and right side and right-front. In some embodiments, a network device can reorder a plurality of images such that a third group of images following a second group of images shows an item from a set of third viewpoints that are interspersed between first viewpoints and second viewpoints. In some embodiments, a network device can reorder a plurality of images to include further groups of images (e.g., a fourth group, a fifth group, etc.). In various embodiments, each group from a third group on can include images from a viewpoint that is interspersed between the viewpoints of the preceding two groups. For example, a fourth group of images can show the item from viewpoints interspersed between second viewpoints and third viewpoints.

In some embodiments, a network device can convert a captured plurality of images into a video file. In many embodiments, a network device can send a video file to a computing device. In various embodiments, converting a plurality of images into a video file can provide substantial data compression, which can reduce network latency in transmitting the video file.

In one or more embodiments, a computing device can receive a video file from a network device. In these or other embodiments, a computing device can read a first group of images from a video file, and can then present the first group of images as a virtual display. For example, a computing device can render a virtual display of an item using a first group of images. In one or more embodiments, a computing device can render a virtual display using a first group of images before the computing device decodes a second group of images from a video file. In one or more embodiments, a computing device can render a virtual display using a first group of images before a second group of images is received by the computing device.

In one or more embodiments, a computing device can read information indicating a place of each image in a sequence (e.g. the sequence in which each of the plurality of images was originally captured by a network element) from a first group of images. In these or other embodiments, a computing device can read information indicating a place of each image of a second group of images in a sequence from a second group of images in a video file, wherein the second group of images follows a first group of images in the video file. In various embodiments, a computing device can render a virtual display including each image of a second group of images together with images of a first group of images according to information indicating a place of each image in a sequence. In one or more embodiments, a computing device can read information indicating a place of each image of a third group of images in a sequence from the third group of images in a video file, wherein the third group of images follows a second group of images in the video file. In one or more embodiments, a computing device can render a virtual display including each image of a third group of images together with images of first and second groups of images according to information indicating a place of each image in a sequence. In various embodiments, a computing device can render a virtual display using images from a first group of images, then update the virtual display using images from a second group and/or can then re-update the virtual display using images from a third group. In this manner, a computing device can efficiently and rapidly render a virtual display using images from the first group, which show the item from a plurality of viewpoints around the item. Further, as the computing device receives and decodes more groups of images, the computing device can include the images from subsequent groups (i.e., the second group, the third group, etc.) in the virtual display.

Various embodiments can provide various advantages including that users do not have to wait for a whole video to download before experiencing a sequence of an image because various embodiments disclosed herein can include streaming a video file and extracting frames from the video file as it is streaming. This can provide users with a faster user experience and lower transmission times for a virtual display. Various embodiments can provide additional advantages including video security. For example, a malicious actor attempting to scrape video files from a website would be unable to play the video files correctly because the scraped video files display images in a random order that will not show a 360 degree view. When the scraped video files are played on a typical video player, they will play in an order received and not in an order as determined by a frame number coded on each frame of the video, as described herein.

A number of embodiments can include a system. The system can include one or more processors and one or more non-transitory computer-readable storage devices storing computing instructions. The computing instructions can be configured to run on the one or more processors and perform capturing two or more images of an item in a sequence; extracting one or more groups of images from the two or more images of the item in the sequence; converting at least one group of the one or more groups of images into a video file; and coordinating displaying, on a user electronic device of a user, a virtual display of the item, the virtual display of the item comprising the video file. Other embodiments are disclosed herein.

Various embodiments include a method. The method can be implemented via execution of computing instructions configured to run at one or more processors and configured to be stored at non-transitory computer-readable media The method can comprise capturing two or more images of an item in a sequence; extracting one or more groups of images from the two or more images of the item in the sequence; converting at least one group of the one or more groups of images into a video file; and coordinating displaying, on a user electronic device of a user, a virtual display of the item, the virtual display of the item comprising the video file. Other embodiments are disclosed herein.

The systems, methods, and devices of the various embodiments enable the rapid and efficient generation of a virtual display of an item. In one or more embodiments, a processor of a network device can capture a plurality of images of an item, each of the plurality of images showing the item from a different viewpoint, convert the captured plurality of images into a video file, and send the video file to a computing device to be displayed in a virtual display of the item. In one or more embodiments, the processor can capture each of the plurality of images in a sequence. In one or more embodiments, the processor can encode each of the plurality of images with information indicating a place of each image in the sequence.

In one or more embodiments, the processor can reorder the captured plurality of images such that a first group of images shows the item from different first viewpoints around the item. In one or more embodiments, the first group of images can show the item from viewpoints at least 45° apart. In one or more embodiments, the processor can reorder the captured plurality of images such that a second group of images following the first group of images shows the item from different second viewpoints around the item interspersed between the first viewpoints. In one or more embodiments, the processor can reorder the captured plurality of images such that a third group of images following the second group of images shows the item from different third viewpoints around the item interspersed between the first viewpoints and the second viewpoints. In one or more embodiments, the processor can reorder the captured plurality of images such that a fourth group of images following the third group of images shows the item from different fourth viewpoints around the item interspersed between the second viewpoints and the third viewpoints.

In one or more embodiments, a processor of a computing device can receive a video file comprising images of an item showing the item from different viewpoints, read from a first group of images in the video file information indicating a place of each image in a sequence, and render a virtual display of the item using the first group of images. In one or more embodiments, the processor can render the virtual display of the item using the first group of images before a second group of images in the video file is decoded from the video file. In one or more embodiments, the processor can read from a second group of images in the video file following the first group of images in the video file information indicating a place of each image in the second group of images in the sequence, and can render the virtual display including each image of the second group of images according to the information indicating the place of each image in the sequence.

In one or more embodiments, the processor can read from a third group of images in the video file following the second group of images in the video file information indicating a place of each image in the third group of images in the sequence, and the processor can render the virtual display including each image of the third group of images according to the information indicating the place of each image in the sequence. In one or more embodiments, the processor can read from a fourth group of images in the video file following the third group of images in the video file information indicating a place of each image in the fourth group of images in the sequence, and the processor can render the virtual display including each image of the fourth group of images according to the information indicating the place of each image in the sequence.

FIG. 1 illustrates a network system 100 suitable for use with various embodiments disclosed herein. For ease of discussion, many of the embodiments are discussed in relation to motor vehicles. However, embodiments discussed herein can be applied to any of a variety of items. Network system 100 can include multiple devices, such as a buyer computing device 102, a seller server 106, an annotator computing device 104, and an item imaging system 108 connected to a communication network 112, such as the Internet. As an example, a buyer computing device 102 can be a laptop, tablet, desktop, smartphone, etc., operated by a buyer intending to shop for and/or purchase an item (e.g., a vehicle). Buyer computing device 102 can include a network interface enabling the buyer computing device 102 to establish a network connection 103, such as a wired or wireless connection via a router and/or base station, to the communication network 112.

Seller server 106 can be part of a financial and inventory management system which can include a database 110 of seller information (e.g., seller records), inventory information, (e.g., seller inventory records), and/or financial information (e.g., financing records). In many embodiments, seller server 106 can manage/update information within database 110 and/or make the information from database 110 available to other devices, as well as perform operations using the information within database 110 and provided from other devices. As an example, seller server 106 can host a web portal accessible as a series of web pages enabling access to database 110 and providing results of operations performed by seller server 106. As another example, seller server 106 can host a series of web pages enabling buyer computing device 102 to retrieve and render images, videos, etc. of one or more vehicles for sale, thereby enabling an interactive tour of a virtual display of a vehicle to be conducted by a buyer operating buyer computing device 102. Seller server 106 can include a network interface enabling seller server 106 to establish a network connection 101, such as a wired or wireless connection via a router and/or base station, to the communication network 112.

Item imaging system 108 can be systems that include one or more cameras, lights, lifts, turntables, structures, processors, etc., configured to generate one or more images of an item, such as a vehicle. As an example, item imaging system 108 can include a series of structures, such as a "roundhouse" and "hot box," including cameras, lights, and processors, configured to generate images of an inside and outside of a vehicle for use in generating a virtual display of the vehicle. Item imaging system 108 can include a network interface enabling item imaging system 108 to establish a network connection 107, such as a wired or wireless connection via a router and/or base station, to communication network 112. Item imaging system 108 can optionally include a connection 109 and/or a connection 113, such as wired and/or wireless connections, directly to annotator computing device 104 and/or seller server 106.

Annotator computing device 104 can be a computing device, such as a laptop or desktop computer, enabling an operator, such as an employee of a vehicle seller, to annotate images of a vehicle. For example, the images can be images of a vehicle generated by item imaging system 108, received from item imaging system 108 and/or received from seller server 106. Annotator computing device 104 can include a network interface enabling annotator computing device 104 to establish a network connection 105, such as a wired or wireless connection via a router and/or base station, to communication network 112. Annotator computing device 104 can optionally include a connection 111, such as a wired or wireless connection, directly to seller server 106. Buyer computing device 102, seller server 106, item imaging system 108, and/or annotator computing device 104 can exchange data with each other via their respective network interfaces, respective network connections 101, 103, 105, 107 to communication network 112, and/or optionally via connections 109, 111, 113.

In one or more embodiments, an item imaging system can include an image capture area or photo booth. For example, an item imaging system can include two image capture areas, such as a roundhouse and a hot box.

In one or more embodiments, a roundhouse can comprise a structure, such as a domed structure, including one or more cameras, such as three cameras, one or more lights, such as fifty or more lights, and/or a vehicle turntable, such as a twenty foot wide vehicle turntable. In various embodiments, an exterior (or interior) of a vehicle placed on a vehicle turntable can be photographed within a roundhouse by one or more cameras to generate a plurality of images (i.e., exterior photos (or interior photos)) of the vehicle. In many embodiments, a plurality of images can be captured in a series of sequences automatically recorded and timed with firing of lights of a roundhouse and/or a movement of a vehicle turntable. In these or other embodiments, one or more cameras can be any type cameras, such as still photo cameras, video cameras, etc. In various embodiments, a plurality of images can be captured in any manner, such as in a series of individual still images, as a video sequence, etc.

In one or more embodiments, a roundhouse can be a structure with a circular base and a conical or spherical ceiling. In various embodiments, a roundhouse can be a completely enclosed structure. In these or other embodiments, walls of a roundhouse can be curved and/or can be painted a uniform white with a ring of grey at a base of the walls. In many embodiments, a floor of the roundhouse can be composed of a mechanical turntable, which can also be painted grey. In some embodiments, there can be a gap between an edge of a turntable and an outer wall of a roundhouse. In these embodiments, a ring around a perimeter of the turntable formed by the gap between the turntable and the outer wall can be filled with lighting equipment. In many embodiments, lighting equipment in a roundhouse is not directly visible to cameras of the roundhouse. In various embodiments, there can be any number of cameras, such as one, two, three, four, or more cameras. In these or other embodiments, one or more cameras can be any type of camera, such as still photo cameras, video cameras, etc. In a specific embodiment, there can be three cameras in the roundhouse. One camera can be positioned directly above a floor of the roundhouse and approximately centered with a turntable to capture a top view of the vehicle. A second camera can be set in approximately a center of a wall of the roundhouse and can be configured to record eye level images. A third camera can be set at an angle higher up on a ceiling of the roundhouse between the first camera and the second camera. In some embodiments, there can a break in a lighting ring and smooth surface of an interior wall of a roundhouse. This break can be a single enter/exit point for the roundhouse.

Figure 2A:
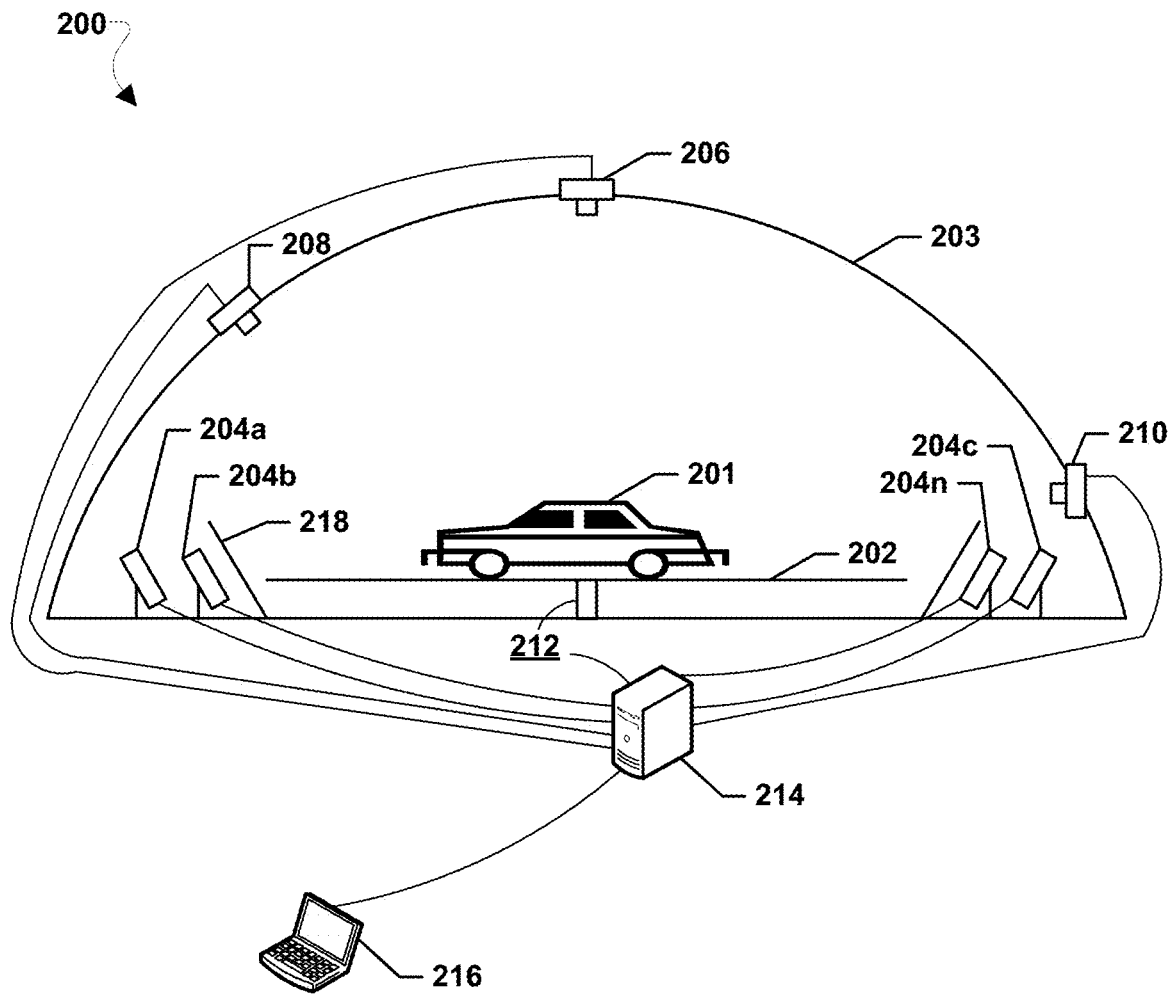
FIGS. 2A and 2B illustrate views of a component block diagram of a roundhouse according to an embodiment.
Figure 2B:
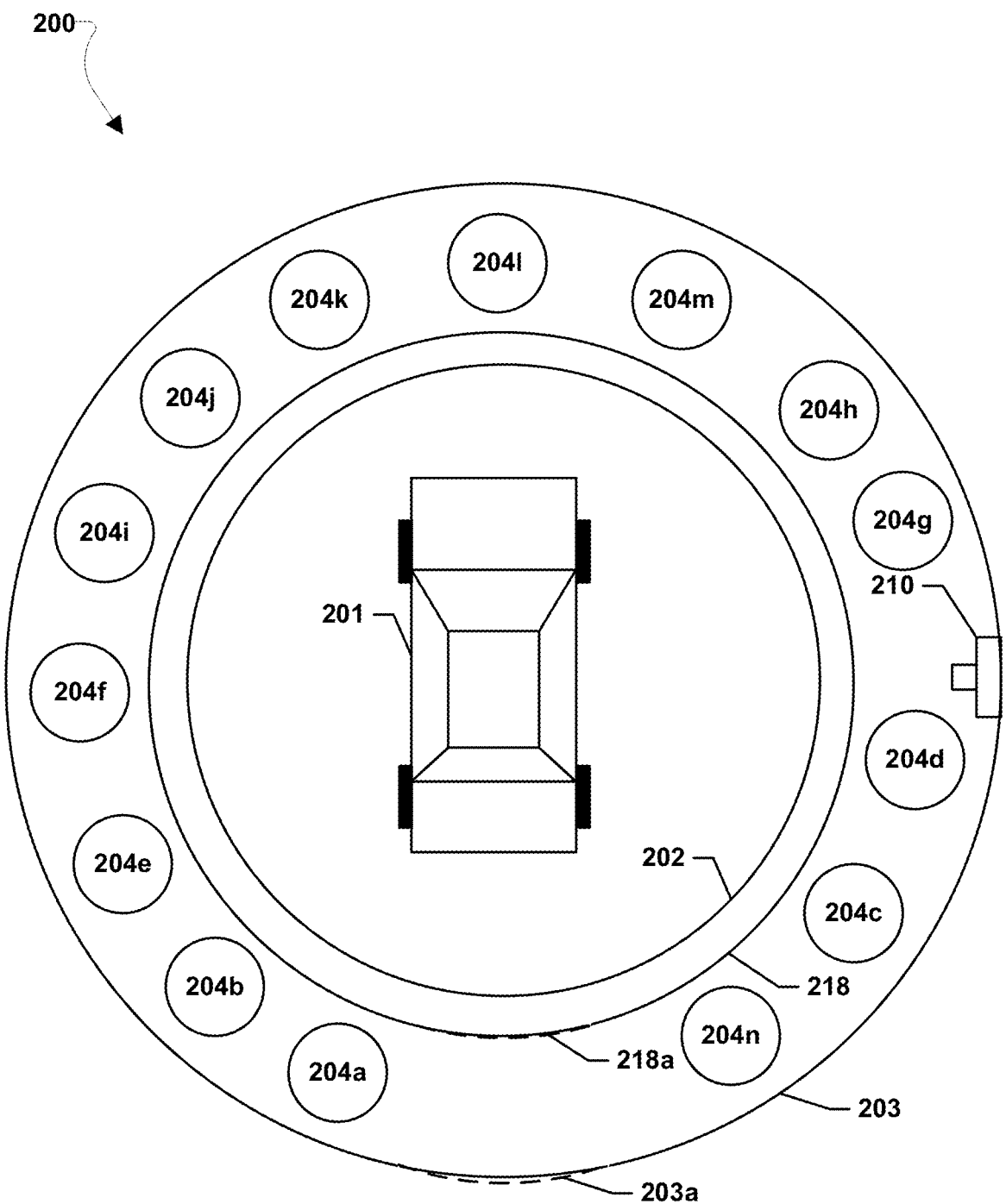

FIGS. 2A and 2B illustrate views of a roundhouse 200 according to an embodiment. FIG. 2A illustrates a side cutaway view of roundhouse 200, and FIG. 2B illustrates a top down cutaway view of roundhouse 200. In one or more embodiments, roundhouse 200 can include a dome ceiling 203, a turntable 202, a series of one or more lights 204a . . . n, and one or more cameras, such as cameras 206, 208, and 210.

In one or more embodiments, turntable 202 can be a twenty foot diameter turntable configured to support up to 8,000 pounds. In these or other embodiments, turntable 202 can be controlled by a controller 212, such as a programmable logic controller (PLC), connected to a roundhouse processor 214. In various embodiments, a roundhouse processor can be connected to a roundhouse control terminal 216. In many embodiments, roundhouse control terminal 216 can comprise a user interface (such as an 8.4 inch color thin film transistor (TFT) touch screen with hand held remote). In one or more embodiments, roundhouse processor 214 and control terminal 216 can be separate computing devices or can be the same computing device. In many embodiments, turntable 202 can be capable of being operated manually via roundhouse control terminal 216 and/or can be configured to rotate automatically. For example, turntable 202 can be configured to rotate in response to commands from a roundhouse processor 214 configured to control an overall operation of roundhouse 200. In one or more embodiments, turntable 202 can be programmed to rotate once a full 360 degrees clockwise or once 360 degrees counterclockwise followed by a 180 degree further rotation. A speed of rotation can be variable to within one revolution per minute (RPM). Physically, turntable 202 can be a circular surface set over a circular track with several wheels mounted on spacers. In there or other embodiments, turntable 202 can rotate around its main support (e.g., a center bearing) and can be powered by a motor operating a drive assembly which can use a drive wheel to propel turntable 202. In various embodiments, there can be a reducer which can be used to slowly stop turntable 202 as a way to mitigate the stress of sudden changes in velocity. In these or other embodiments, a motor, drive assembly, and/or reducer can be electronically connected to a control panel and/or controller 212. In many embodiments, the turntable 202 can be painted in a grey paint similar to a base portion of a wall described above. In this way, a blending effect can be applied to a final photography product (e.g., images in a virtual display).

In many embodiments, roundhouse 200 can comprise a lighting system. In various embodiments, roundhouse 200 can include a series of lights 204a-204n. As an example, roundhouse 200 can include fifty seven separate lights. In one or more embodiments, lights 204a-204n of roundhouse 200 can include Alien Bees model B1600 lights from White Lightning. In these or more embodiments, roundhouse 200 can include a series of additional lighting related equipment, such as reflectors (e.g., in light reflectors), flash tubes, lamps (e.g., a 150 watt modeling lamp), etc. In many embodiments, lights 204a-204n in roundhouse 200 can be located around a perimeter of turntable 202. In these or other embodiments, lights 204a-204n can be hidden by a raised border 218 that can lie between turntable 202 and outer wall/ceiling 203. In various embodiments, raised border 218 can be painted grey to match turntable 202 and outer wall 203 can be painted white. In some embodiments, raised border 218 can ensure that lights 204a-204n are not visible on photographs taken in a roundhouse because the raised border 218 surrounding the lights 204a-204n can blend in with a floor in photographs.

In one or more embodiments, the series of lights 204a-204n can each be connected to the processor 214, which can be configured to control the power output of any of the series of lights 204a-204n. In one or more embodiments in which the series of lights 204a-204n can be comprised of fifty seven lights, each of the fifty seven lights can be assigned to one of five categories. In various embodiments, more than half of the lights, such as forty six out of the fifty seven lights, can serve as ring slaves (S) and can be evenly spaced around the perimeter of the roundhouse. In some embodiments, ring slave lights can point at upward angles ranging from ten to thirty degrees toward the outer wall and away from the turntable. In this way, the S group of lights can serve to create a ring of light around the turntable. This reflected light can then create ambient light by reflecting off of one or more walls to create an all-around soft glow over the subject to be photographed (e.g., the vehicle). In one or more embodiments, ring slave (S) lights can be identified by a letter and a number. In some embodiments, the letter can correspond to the side of the room that the light can rest at (e.g., L for left and R for right). Each light can then be ordered from 1 to 24. In various embodiments, lights L5 and R6 can be excluded from this numbered group as they can serve as the Ring Sync lights (A). In many embodiments, at least two lights, LB and RB, can be Side Accent Lights (B). In various embodiments, Side Accent lights (B) can rest between L10 and L11. In these or other embodiments, Side Accent lights (B) can rest between R9 and R10 respectively. In many embodiments, lights can use reflectors to increase their range. In some embodiments, at least two lights, LC and RC, can serve as Front Accent Lights (C). In various embodiments, LC can be located between L4 and L5, and can be 44.75 inches from a wall. In some embodiments, RC can be located between R3 and R4, and can be 45.5 inches from a wall. In some embodiments, RD, which can be a right-side component of Front and/or Rear Accent Lights (D), can be located behind R5. LD, a left side counterpart to RD, can be located between L15 and L16. In various embodiments, LD can be 15.75 inches from a wall. In some embodiments, lights can be placed on 38-inch high stands.

In various embodiments, there can be additional lights that are on 43 inch stands. In some embodiments, the additional lights can be placed at angles of 40 degrees and/or 30 degrees from the base or bottom of roundhouse 200. In many embodiments, additional lights can also be ring slave (S) lights. In these embodiments, the additional lights can be off set from at least one light of the ring slave (S) lights. In many embodiments, additional lights can be placed opposite entryways 203a and 218a, through wall 203 and raised border 218, and/or into the interior of roundhouse 200. This is because, in some embodiments, entryways 203a and 218a do not have lights in front of them, thereby enabling a vehicle 201 to drive into and out of roundhouse 200. In some embodiments, additional lights can enable any vehicle 201 or another, different product that can be placed within the roundhouse 200 to be well lit without having to manually adjust positions, heights, angles, and/or power output of any one of lights 204a-204n.

In one or more embodiments, to facilitate the lighting of the vehicle 201, a processor 214 can designate that only certain lights fire for certain alignments of turntable 202 and/or configurations of cameras 206, 208, and 210. In many embodiments, each category of light (e.g., S, A, B, C, and D) can be fired by processor 214 when specific cameras of cameras 206, 208, and/or 210 are taking a picture.

In many embodiments, roundhouse 200 can include any number of cameras, such as cameras 206, 208, and 210. In various embodiments, cameras of roundhouse 200, can be any type cameras (e.g., still photo cameras, video cameras, etc.). As one example, cameras 206, 208, and 210 can be Nikon D800 digital SLRs. In one or more embodiments, each camera 206, 208, and 210 can use an AF-S Nikkon 24-70 mm f/2.8 G ED lens. One or more cameras 206 can be positioned above a center of turntable 206 and be facing down. In some embodiments, this camera can be known as a Top Down camera and/or as camera #1. In various embodiments, one or more cameras 210 can be positioned parallel to a side wall and/or directly across from access doors 203a and 218a. In one or more embodiments, there can be a section of wall cut out to allow camera 210, which can be housed just behind or inside of wall 203, a view out into an interior room of roundhouse 200. In various embodiments, this camera can be referred to as a Hero Camera and/or camera #2. In many embodiments, camera 210 can approximate a person's eye level view. In some embodiments, one or more cameras 208, which can be referred to All Open camera and/or as camera #3, can be positioned on wall 203 above a height of wall 202. In these or other embodiments, camera 208 can be placed at an angle, and/or can be used to capture one or more images of a vehicle 201 with all of its doors and/or other hatches open. In some embodiments, camera 208 can be an ideal compromise between the camera 206 and camera 210 when capturing a wider shot of vehicle 201. This is due, in part, by extra volume a vehicle 201 can appear to take up when it has its doors open wide. Each of camera 206, 208, and 210 can serve a particular purpose both with regards to the movement of turntable 200 and to firing of certain lights of lights 204a-204n. In various embodiments, a plurality of images can be captured by one or more of cameras 206, 208, 210. For example, images can be captured in a series of individual still images, as a video sequence, etc.

In many embodiments, processor 214 can control one of more of cameras 206, 208, and 210 to capture one or more images of vehicle 201 (or any other item) from different viewpoints around the vehicle 201 (or the other item). In various embodiments, one or more images can be captured in any manner, such as in a series of individual still images, as a video sequence, etc. In one or more embodiments, each of cameras 206, 208, and 210 can be connected to processor 214, and can be controlled by the processor 214 to take images (e.g., photographs, videos, etc.) of the vehicle 201 (or any other item) as one or more lights 204a-204n are fired and/or while turntable 202 is rotated. Each of cameras 206, 208, and 210 can send images (e.g., photographs, videos, etc.) to processor 214 for storage and/or transmission onto other devices for further processing or display.

In one or more embodiments, there can be at least two procedures that turntable 200 can be programmed to perform. In some embodiments, these procedures can be performed automatically in response to control signals from processor 214. In these or other embodiments, different procedures can use their own respective combination of cameras 206, 208, and/or 210, which in turn can relate to different respective combinations of lights 204a-204n. Two exemplary procedures can be called Event A and Event B, and can be used for specific photographic purposes. In some embodiments, event A can be used for capturing an exterior (and/or interior) of vehicle 201 with all doors closed (or open, and/or partially open/closed). In many embodiments, turntable 200 can be set at a home position (e.g., zero degrees of rotation) before a procedure begins, which can be done from control terminal 216 (e.g., a touch screen). In various embodiments, an operator can begin Event A by selecting the event on control terminal 216, such as by selecting a button of the labeled "Event A." In response to the selection of Event A, processor 214 can prompt cameras 206 and 210 (e.g., the Top Down and Hero cameras) to wake up and/or fire (e.g., take a photograph). In some embodiments, when Top Down camera 206 fires, lights designated as S or D can be used. In this way, Hero camera 210 can record an image of a front of a vehicle using the A, B, and S lights. Next, turntable 200 can begin to rotate a full 360 degrees. In one or more embodiments, Hero camera 210 can record additional images as turntable 200 passes specific positions. For example, camera 210 can record images at 22 degrees, 44 degrees, 68 degrees, 90 degrees, 113 degrees, 136 degrees, 158 degrees, 180 degrees, 202 degrees, 224 degrees, 247 degrees, 270 degrees, 293 degrees, 316 degrees, and 338 degrees. In some embodiments, the position at 360 degrees can also be the position at 0 degrees. In these embodiments, therefore, there can be no need to record an image at 360 degrees. In many embodiments, Event A can finish when vehicle 201 and/or turntable 202 is returned to their original positions. In one or more embodiments, processor 214 can control one or more of cameras 206, 208, and 210 to capture a plurality of images of vehicle 201 (or any other item) in a sequence. In one or more embodiments, processor 214 can encode each of a plurality of images with information indicating a place of each image in a sequence.

Upon completion of Event A, an operator can walk into roundhouse 200 and open all doors, hood, and trunk/hatchback on vehicle 201. In some embodiments, Event B can be run immediately after Event A. In these or other embodiments, Event B can be initiated by an operator using control terminal 216 (e.g., by selecting a button labeled "Event B"). In various embodiments, Event B can use the same and/or similar positions along a path of turntable 202 to key cameras to fire, but, instead of using Hero camera 210, Event B can use All Open camera 208. In these embodiments, camera 206 can still fire first, but then camera 208 can fire after camera 206. In many embodiments when camera 208 fires, processor 214 can control lights A, B, S, and C as discussed above. In various embodiments, camera 208 can then record an image for each pre-set position as the turntable rotates. In many embodiments, procedures described above can be automated and controlled by processor 214. In some embodiments, a procedure can end by rotating turntable 202 to a position where vehicle 201 can exit. For example, turntable 201 can be rotated 180 degrees so that vehicle 201 can easily exit. As another example, turntable 201 can be rotated so that a front side or reverse side of vehicle 201 is orientated towards an access door of the roundhouse 200 (e.g., 203a and/or 218a).

In many embodiments, when there is an error and/or an emergency, an operator can stop an automated procedure at any point, and can then move turntable 202 manually in either direction. In these or other embodiments, an operator can reprogram positioning for any photograph taken using control terminal 216. While discussed in terms of two events and a series of 16 photos in each event, there can be more or less events and more or less photos in each event. For example, processor 214 can direct additional events and/or photos to be undertaken when adjustments to photos and/or vehicle 201 positioning are needed.

FIGS. 3A-3D illustrate viewpoints of an item (e.g., vehicle 201) from which images of the item can be captured as part of a method of generating a virtual display. With reference to FIGS. 1-3D, a processor of a network device (e.g., seller server 106, which can include, control, or incorporate controller 212, roundhouse processor 214, or another suitable controller or processor) can control one or more cameras (e.g., cameras 206, 208, and 210) to capture images of vehicle 201 (or any other item). In one or more embodiments, a processor can control one or more cameras to capture images of vehicle 201 in a sequence. For example, the processor can control sequence 310 starting at viewpoint 302a and proceeding counterclockwise. In various embodiments, one or more cameras can be any type camera (e.g., a still photo camera, a video camera, etc.). In various embodiments, images can be captured in any manner (e.g., in a series of individual still images, as a video sequence, etc.).

In one or more embodiments, a processor can reorder a captured plurality of images such that a first group of images shows an item from different first viewpoints around the item. For example, a first group of images 300a (FIG. 3A) can show the vehicle 201 from eight viewpoints 302a-302h that are different viewpoint around the items. As one example, the first group of images 300a can include viewpoints of a front 302a, left-front 302b, left side 302c, left-rear 302d, rear 302e, right-rear 302f, right side 302g, and/or right-front 302h of vehicle 201. In many embodiments, a first group of images can show an item from one or more viewpoints at least 45° apart. It will be appreciated that the various viewpoints need not show a 360° view of an item, and can instead show any variety or combination of viewpoints around the item (e.g., a 180° view or a smaller arc of viewpoints). In these or other embodiments, various viewpoints can include views of the top and/or bottom of an item from one or more angles.

In many embodiments, a processor can reorder a captured plurality of images such that a second group of images shows an item from different second viewpoints around the item. For example, a second group of images 300b (FIG. 3B) can show vehicle 201 from eight viewpoints 304a-304h that are different from each other, and at least partially different from first viewpoints 302a-302h. In one or more embodiments, the second viewpoints can be interspersed between the first viewpoints.

In many embodiments, a processor can reorder a captured plurality of images such that a third group of images shows an item from different third viewpoints around the item. For example, a third group of images 300c (FIG. 3C) can show the vehicle 201 from sixteen viewpoints 306a-306p that are different from each other, and at least partially different from first viewpoints 302a-302h and second viewpoints 304a-304h. In one or more embodiments, third viewpoints can be interspersed between first viewpoints and/or second viewpoints.

In one or more embodiments, a processor can reorder a captured plurality of images such that a fourth group of images shows an item from different fourth viewpoints around the item. For example, a fourth group of images 300d (FIG. 3D) can show a vehicle 201 from 32 viewpoints 308a-308ff that are different from each other and at least partially different from first viewpoints 302a-302h. In one or more embodiments, fourth viewpoints can be interspersed between second viewpoints and/or third viewpoints.

Figures 4A, 4B:
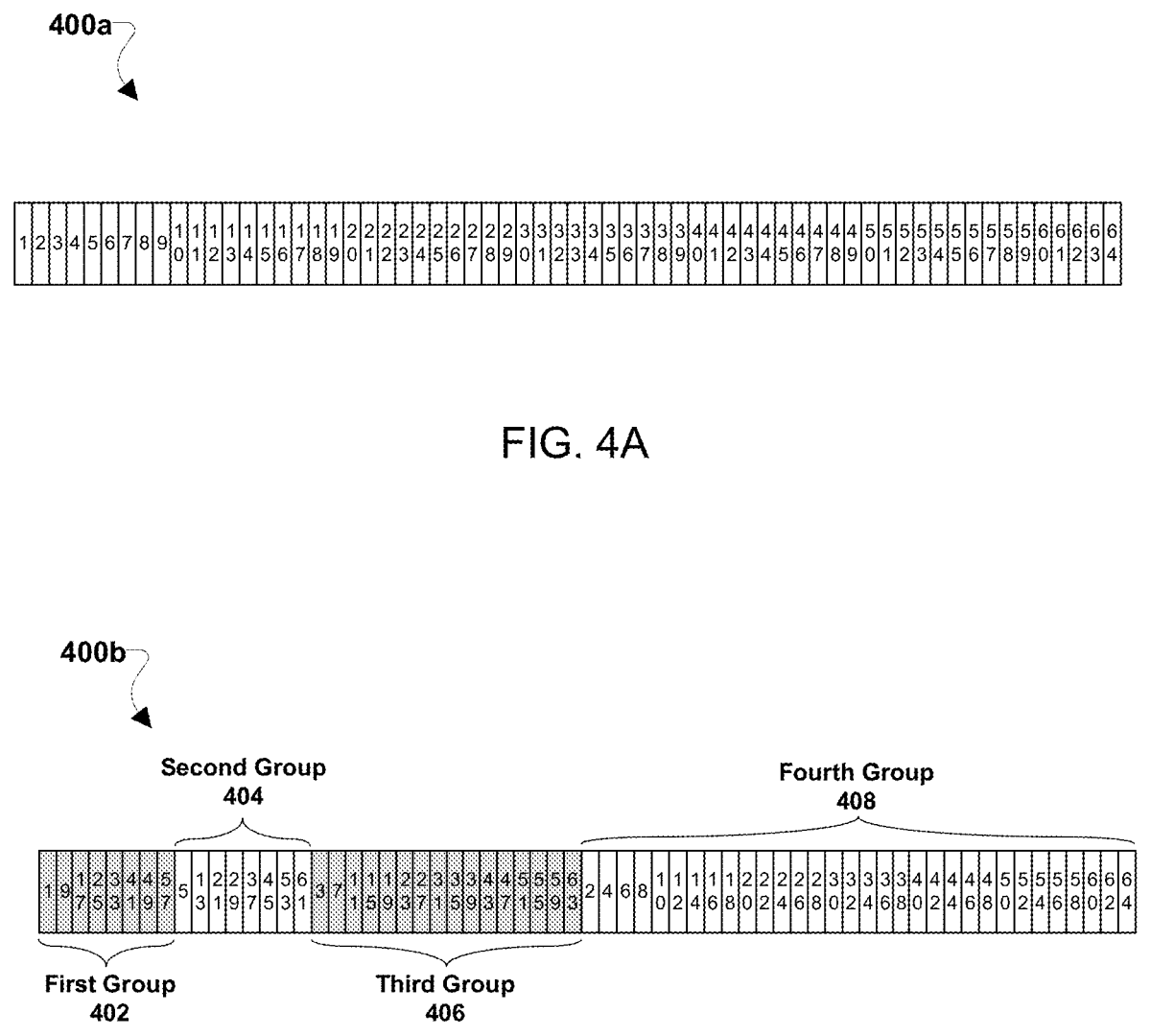

FIGS. 4A and 4B illustrate a plurality of images of an item that can be captured as part of a method of generating a virtual display. With reference to FIGS. 1-4B, a processor of a network device (e.g., seller server 106, which can include, control, or incorporate controller 212, roundhouse processor 214, and/or another suitable controller or processor) can control one or more cameras (e.g., cameras 206, 208, and 210) to capture images of vehicle 201 (or any other item). In various embodiments, one or more cameras can be any type cameras (e.g., still photo cameras, video cameras, etc.). In various embodiments, a plurality of images can be captured in any manner (e.g., in a series of individual still images, as a video sequence, etc.). In one or more embodiments, a processor can control one or more cameras to capture images of vehicle 201 in a sequence, such as sequence 400a, which illustrates an example of 64 images sequence. In many embodiments, a processor can encode each of a plurality of images in sequence 400a with information indicating a place of each image in the sequence.

In one or more embodiments, a processor can reorder a captured plurality of images into a reordered plurality of images (e.g., images 400b). In many embodiments, reordered plurality of images 406b can include groups of images showing an item (e.g., vehicle 201) from different viewpoints, such as a first group 402, a second group 404, a third group 406, and a fourth group 408. In various embodiments, a greater or fewer number of groups can be used.

Figure 3A:
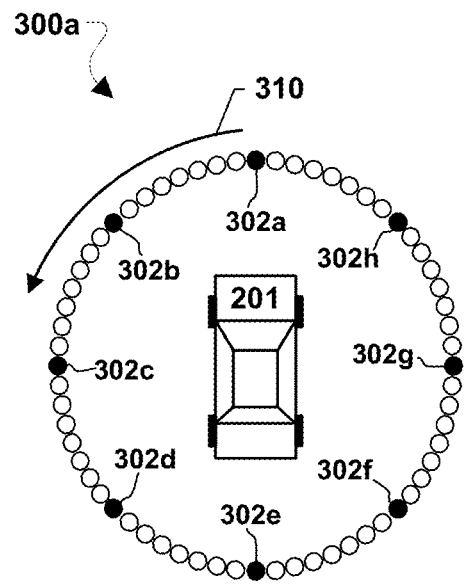
FIGS. 3A-3D illustrate viewpoints of an item from which images of the item can be captured as part of a method of generating a virtual display.
Figure 3B:
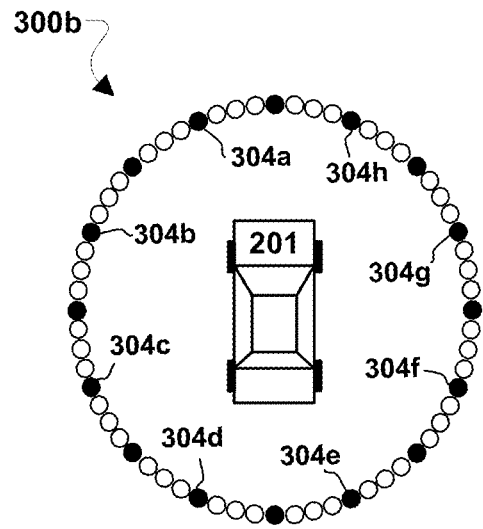
Figure 3C:
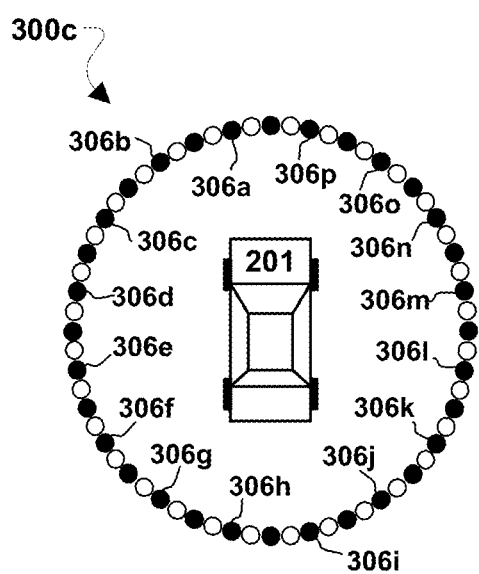
Figure 3D:
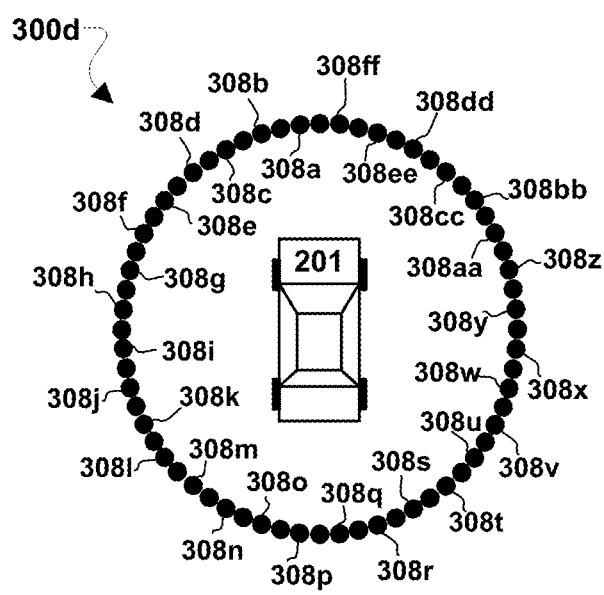

In one or more embodiments, images in first group 402 can correspond to images from the viewpoints 302a-302h in first group 300a (FIG. 3A). In various embodiments, images in second group 404 can correspond to images from viewpoints 304a-304h in second group 300b (FIG. 3B). In many embodiments, images in third group 406 can correspond to images from viewpoints 306a-306p in third group 300c (FIG. 3C). In these or other embodiments, images in fourth group 408 can correspond to images from viewpoints 308a-308ff in fourth group 300d (FIG. 3D)

In some embodiments, a processor can convert reordered images 400b into a video file. In various embodiments, a network device can send the video file to a computing device. In these or other embodiments, converting a plurality of images into a video file can provide substantial data compression, which can reduce network latency in transporting the video file, thereby leading to faster processing times for the plurality of images.

In some embodiments, a computing device can receive a video file from a network device, and the computing device can read from the video file a first group of images, and can present the first group of images as a virtual display. In one or more embodiments, a computing device can render a virtual display of an item using a first group of images before the computing device decodes a second group of images from a video file. In many embodiments, a computing device can render a virtual display using a first group of images before a second group of images is received by the computing device. For example, a processor can render a virtual display using images from viewpoints 302a-302h. In these or other embodiments, a processor can render a virtual display using images from viewpoints 302a-302h before images of subsequent groups are received or decoded (e.g., images from the viewpoints 304a-304h in second group 300b (FIG. 3B), images from viewpoints 306a-306p in third group 300c (FIG. 3C), and images from viewpoints 308a-308ff in fourth group 300d (FIG. 3D)).

In one or more embodiments, a computing device can read information indicating a place of each image in a sequence (e.g., sequence 400a) from each image. In many embodiments, a computing device can add subsequently received and/or decoded images to a virtual display according to sequence information encoded in each image. For example, a computing device can render a virtual display of an item using images from a first group (e.g., images from the viewpoints 302a-302h). In this way, a computing device can quickly render a virtual display showing at least images from a first group, thereby enabling the virtual display to show an item from a plurality of viewpoints. In many embodiments, as additional images are received and/or decoded, a computing device can add the additional images to an already existing virtual display. For example, as one or more images of a second group (e.g., images from viewpoints 304a-304h) are received and/or decoded, a computing device can add images of the second group to a virtual display. Subsequently, as one or more images of a third group (e.g., images from viewpoints 306a-306p) are received and/or decoded, the computing device can add images of the third group to the virtual display. Further, as one or more images of a fourth group (e.g., images from viewpoints 308a-308ff) are received and/or decoded, computing device can add images of the fourth group to the virtual display.

Figure 5:
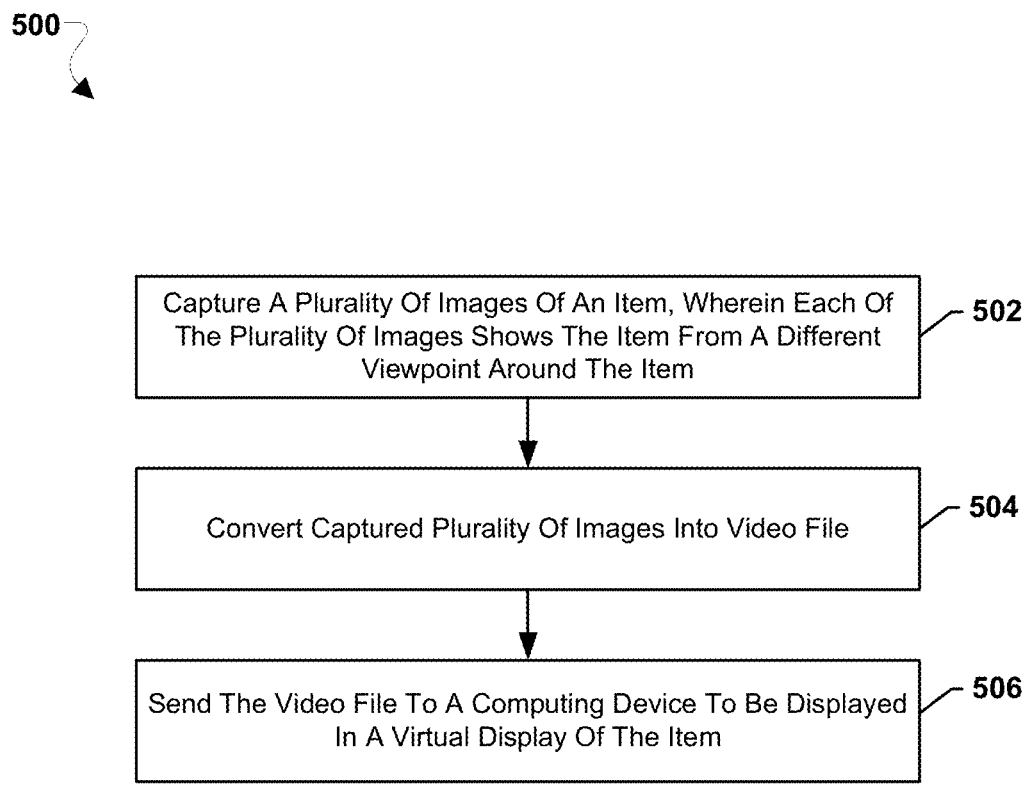
FIG. 5 is a process flow diagram illustrating a method for generating a virtual display of an item according to various embodiments.

FIG. 5 is a process flow diagram illustrating a method 500 of generating a virtual display of an item according to various embodiments. Method 500 is merely exemplary and is not limited to the embodiments presented herein. Method 500 can be employed in many different embodiments or examples not specifically depicted or described herein. In some embodiments, activities (i.e., blocks) of method 500 can be performed in the order presented. In other embodiments, the activities of method 500 can be performed in any suitable order. In still other embodiments, one or more of the activities of method 500 can be combined or skipped. With reference to FIGS. 1-5, the method 500 can be implemented by a processor of a network device (e.g., seller server 106, which can include, control, or incorporate controller 212, roundhouse processor 214, and/or another suitable controller or processor). In these or other embodiments, one or more of the activities of method 500 can be implemented as one or more computer instructions configured to run at one or more processing modules and configured to be stored at one or more non-transitory memory storage modules.

In many embodiments, method 500 can comprise an activity (i.e., block) 502. In block 502, a processor can capture a plurality of images of an item. In these or other embodiments, each of the plurality of images can show an item from a different viewpoint around the item. For example, a processor can capture a plurality of images from viewpoints 302a-302h, 304a-304h, 306a-306p, and/or

308*a*-308*ff*. In one or more embodiments, a first group of images can show an item from viewpoints at least 45° apart. In various embodiments, a plurality of images can be captured in any manner, such as in a series of individual still images, as a video sequence, etc.

In many embodiments, method 500 can comprise an activity (i.e., block) 505. In block 504, a processor can convert a captured plurality of images into a video file. In some embodiments, converting a plurality of images into a video file can provide substantial data compression, which can reduce network latency in transporting the video file.

In many embodiments, method 500 can comprise an activity (i.e., block) 506. In block 506, a processor can send a video file to a computing device to be displayed in a virtual display of the item.

Figure 6:
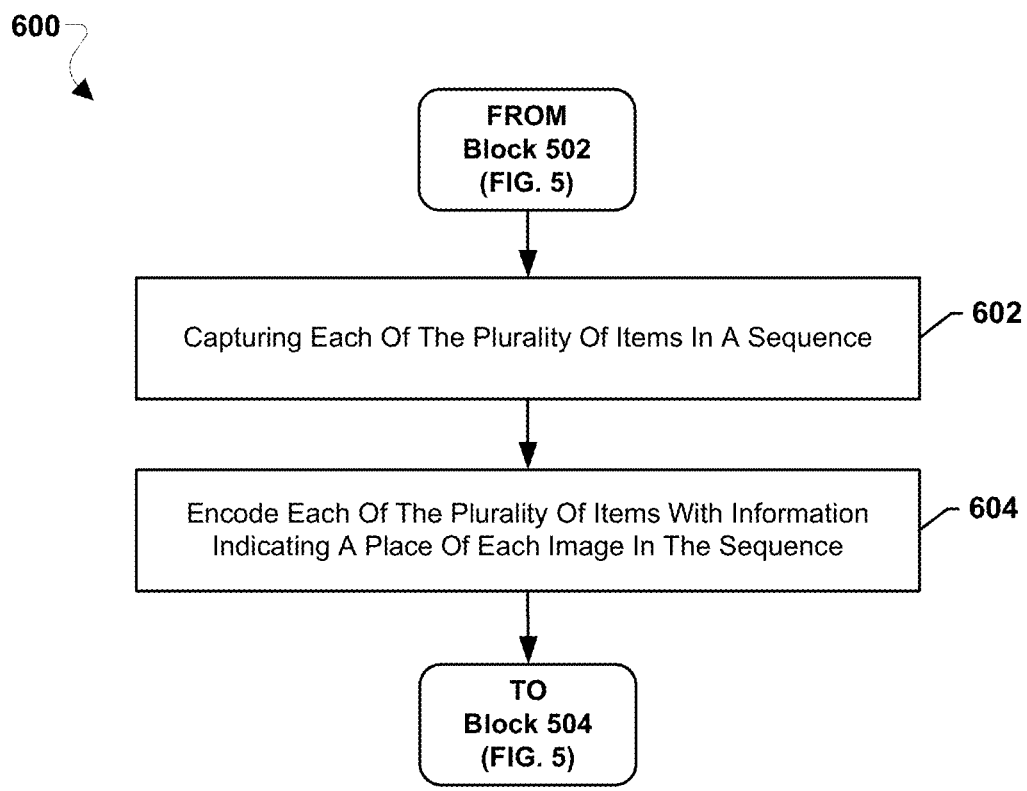
FIG. 6 is a process flow diagram illustrating operations that can be performed as part of the method for generating a virtual display of an item according to various embodiments.

FIG. 6 is a process flow diagram illustrating operations 600 that can be performed as part of the method 500 for generating a virtual display of an item according to various embodiments. Method 600 is merely exemplary and is not limited to the embodiments presented herein. Method 600 can be employed in many different embodiments or examples not specifically depicted or described herein. In some embodiments, activities (i.e., blocks) of method 600 can be performed in the order presented. In other embodiments, the activities of method 600 can be performed in any suitable order. In still other embodiments, one or more of the activities of method 600 can be combined or skipped. With reference to FIGS. 1-6, the operations 600 can be implemented by a processor of a network device (e.g., seller server 106, which can include, control, or incorporate controller 212, roundhouse processor 214, and/or another suitable controller or processor). In these or other embodiments, one or more of the activities of method 500 can be implemented as one or more computer instructions configured to run at one or more processing modules and configured to be stored at one or more non-transitory memory storage modules.

In many embodiments, method 600 can comprise an activity (i.e., block) 602. In some embodiments, block 602 can be performed after block 502 (FIG. 5). In other embodiments, block 602 can be performed as part of block 502 (FIG. 5). In various embodiments, a processor can capture a plurality of images in a sequence (e.g., sequences 310, 400*a*) in block 602. In these or other embodiments, a plurality of images can be captured in any manner, such as in a series of individual still images, as a video sequence, etc.

In many embodiments, method 600 can comprise an activity (i.e., block) 604. Similar to block 602, in some embodiments, block 604 can be performed after block 502 (FIG. 5), and in other embodiments, block 604 can be performed as part of block 502 (FIG. 5). In block 604, in some embodiments, a processor can encode each of a plurality of images with information indicating a place of each image in a sequence. Such information can include, for example, a letter, a number, a symbol, or representation of a letter, number, or symbol indicating a place of each image in a sequence. An example of a representation of a letter, number, or symbol can include any form of encoding, such as a barcode, QR code, or another suitable encoding form. In many embodiments a processor can proceed to perform the operations of block 504 (FIG. 5) after completion of one or more blocks of method 600.

Figure 7:
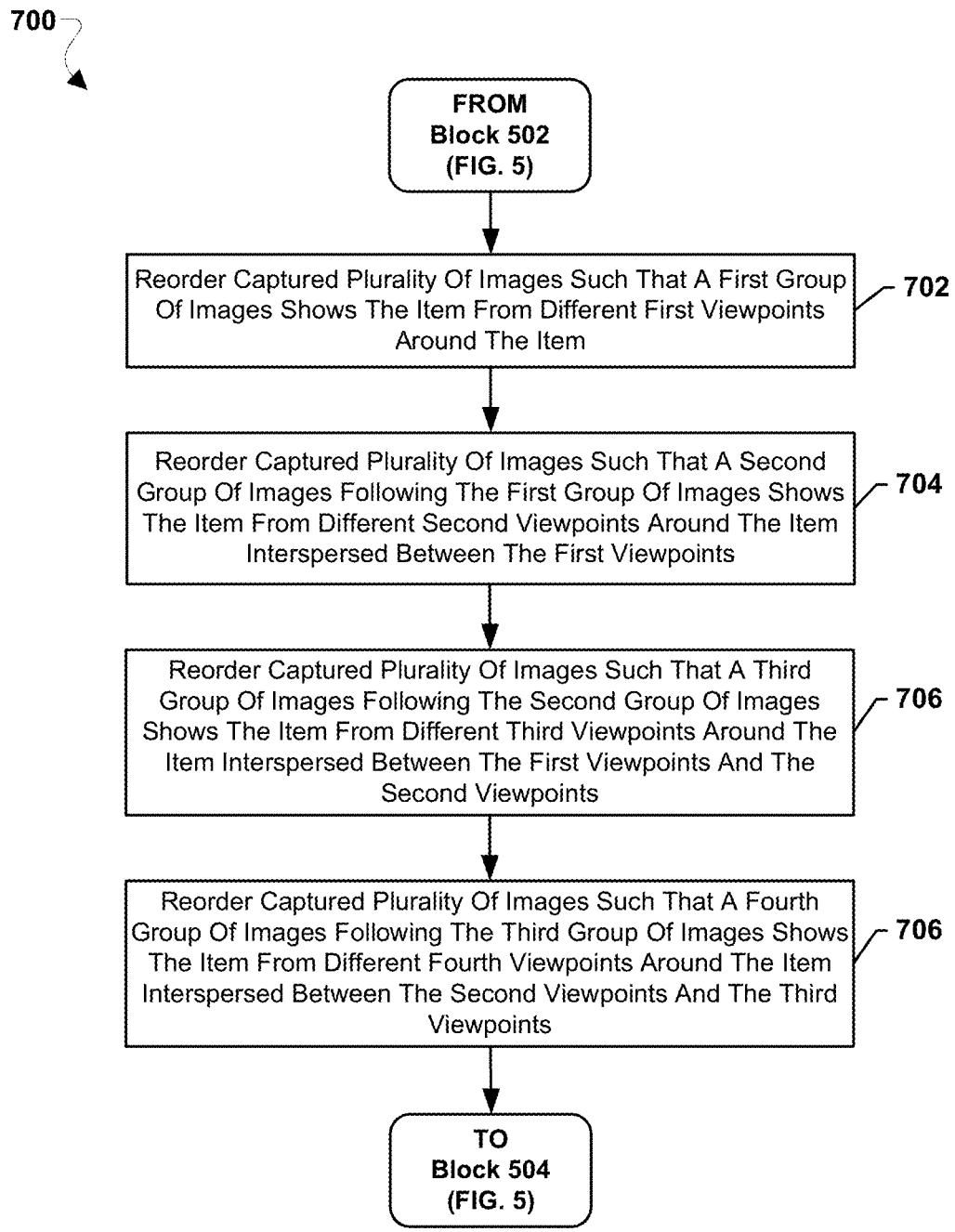
FIG. 7 is a process flow diagram illustrating operations that can be performed as part of the method for generating a virtual display of an item according to various embodiments.

FIG. 7 is a process flow diagram illustrating operations 700 that can be performed as part of the method 500 for generating a virtual display of an item according to various embodiments. Method 700 is merely exemplary and is not limited to the embodiments presented herein. Method 700 can be employed in many different embodiments or examples not specifically depicted or described herein. In some embodiments, activities (i.e., blocks) of method 700 can be performed in the order presented. In other embodiments, the activities of method 700 can be performed in any suitable order. In still other embodiments, one or more of the activities of method 700 can be combined or skipped. With reference to FIGS. 1-7, the operations of method 700 can be implemented by a processor of a network device (e.g., a seller server 106, which can include, control, or incorporate controller 212, roundhouse processor 214, and/or another suitable controller or processor). In these or other embodiments, one or more of the activities of method 700 can be implemented as one or more computer instructions configured to run at one or more processing modules and configured to be stored at one or more non-transitory memory storage modules.

In many embodiments, method 700 can comprise an activity (i.e., block) 702. In various embodiments, block 702 can be performed after block 502 (FIG. 5). In these or other embodiments, a processor can reorder a captured plurality of images such that a first group of images shows an item from different first viewpoints around the item in block 702. For example, a processor can reorder a captured plurality of images such that a first group (e.g., first group 402) shows an item from different first viewpoints around the item (e.g., images from the viewpoints 302*a*-302*h*).

In many embodiments, method 700 can comprise an activity (i.e., block) 704. In block 704, a processor can reorder a captured plurality of images such that a second group of images following a first group of images shows an item from different second viewpoints around the item interspersed between the first viewpoints. For example, the processor can reorder a captured plurality of images such that a second group (e.g., second group 404) shows an item from different second viewpoints around the item (e.g., images from the viewpoints 304*a*-304*h*).

In many embodiments, method 700 can comprise an activity (i.e., block) 706. In block 706, a processor can reorder a captured plurality of images such that a third group of images following a second group of images shows an item from different third viewpoints around the item interspersed between first viewpoints and second viewpoints. For example, a processor can reorder a captured plurality of images such that a third group (e.g., third group 406) shows an item from different third viewpoints around the item (e.g., images from the viewpoints 306*a*-306*p*).

In many embodiments, method 700 can comprise an activity (i.e., block) 708. In block 708, a processor can reorder a captured plurality of images such that a fourth group of images following a third group of images shows an item from different fourth viewpoints around the item interspersed between second viewpoints and third viewpoints. For example, a processor can reorder a captured plurality of images such that a fourth group (e.g., fourth group 408) shows an item from different third viewpoints around the item (e.g., the images from the viewpoints 308*a*-308*ff*). In many embodiments, a processor can block 504 (FIG. 5) after completion of one or more blocks of method 700.

Figure 8:
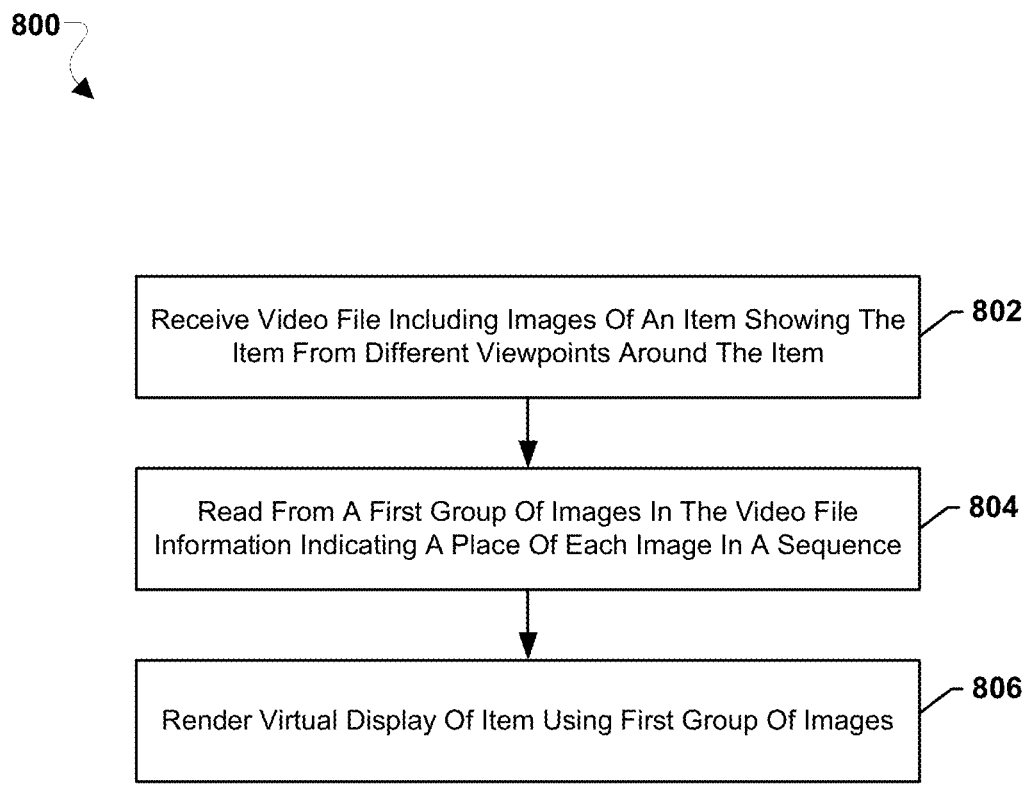
FIG. 8 is a process flow diagram illustrating a method of generating a virtual display of an item according to various embodiments.

FIG. 8 is a process flow diagram illustrating a method 800 of generating a virtual display of an item according to various embodiments. Method 800 is merely exemplary and is not limited to the embodiments presented herein. Method 800 can be employed in many different embodiments or examples not specifically depicted or described herein. In some embodiments, activities (i.e., blocks) of method 800 can be performed in the order presented. In other embodiments, the activities of method 800 can be performed in any suitable order. In still other embodiments, one or more of the activities of method 800 can be combined or skipped. With reference to FIGS. 1-8, method 800 can be implemented by a processor of a computing device (e.g., a buyer computing device 102 and/or another suitable controller or processor). In these or other embodiments, one or more of the activities of method 800 can be implemented as one or more computer instructions configured to run at one or more processing modules and configured to be stored at one or more non-transitory memory storage modules.

In many embodiments, method 800 can comprise an activity (i.e., block) 802. In block 802, a processor can receive a video file including images of an item showing the item from different viewpoints around the item. For example, a processor can receive a video file including a plurality of images from viewpoints 302a-302h, 304a-304h, 306a-306p, and/or 308a-308ff. In one or more embodiments, a plurality of images can be in a reordered sequence (e.g., reordered sequence 400b).

In many embodiments, method 800 can comprise an activity (i.e., block) 804. In block 804, a processor can read information indicating a place of each image in a sequence from a first group of images in a video file. For example, a processor can read information indicating a place of each image in a sequence (e.g., sequence 400a) from a first group of images (e.g., images from viewpoints 302a-302h).

In many embodiments, method 800 can comprise an activity (i.e., block) 806. In block 806, a processor can render a virtual display of an item using a first group of images. For example, a processor can render a virtual display of an item using images from the viewpoints 302a-302h. In one or more embodiments, a processor can render a virtual display of the item using a first group of images before a second group of images (e.g., second group 404, third group 406, and/or fourth group 408) is decoded from a video file.

Figure 9:
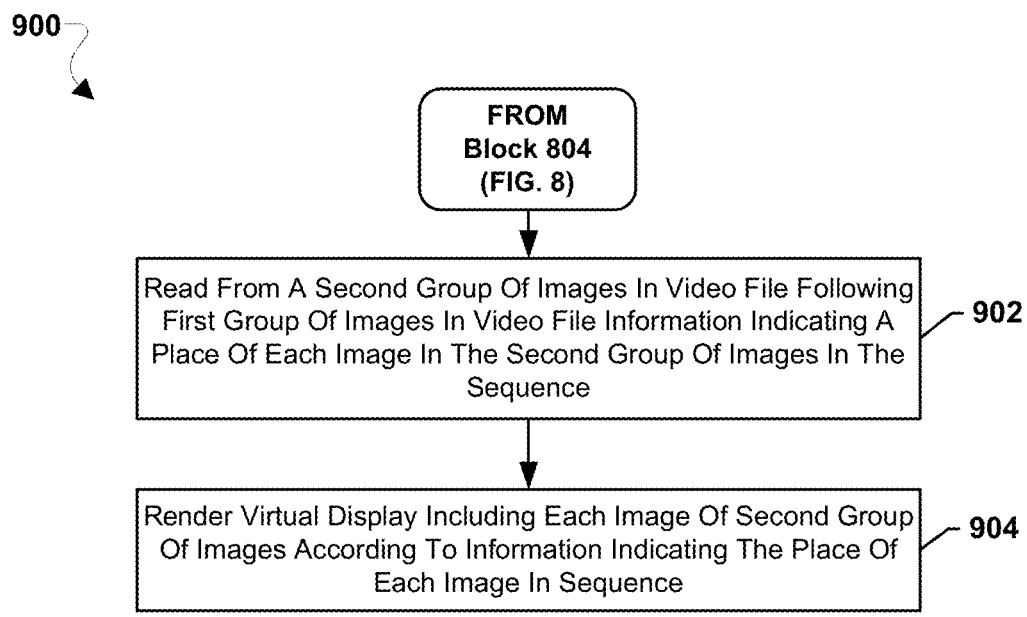
FIG. 9 is a process flow diagram illustrating operations that can be performed as part of the method for generating a virtual display of an item according to various embodiments.

FIG. 9 is a process flow diagram illustrating operations 900 that can be performed as part of method 800 (FIG. 8) for generating a virtual display of an item according to various embodiments. Method 900 is merely exemplary and is not limited to the embodiments presented herein. Method 900 can be employed in many different embodiments or examples not specifically depicted or described herein. In some embodiments, activities (i.e., blocks) of method 900 can be performed in the order presented. In other embodiments, the activities of method 900 can be performed in any suitable order. In still other embodiments, one or more of the activities of method 900 can be combined or skipped. With reference to FIGS. 1-9, the operations 900 can be implemented by a processor of a computing device (e.g., buyer computing device 102 and/or or another suitable controller or processor). In these or other embodiments, one or more of the activities of method 900 can be implemented as one or more computer instructions configured to run at one or more processing modules and configured to be stored at one or more non-transitory memory storage modules.

In many embodiments, method 900 can comprise an activity (i.e., block) 902. In various embodiments, block 902 can be performed after block 804 (FIG. 8). In these or other embodiments, a processor can read information indicating a place of each image in a second group of images in a sequence from the second group of images in the video file following a first group of images in the video file. For example, a processor can read information from each image (e.g., images from the viewpoints 304a-304h) in a second group of images (e.g., second group 404) indicating a place of each image in a sequence (e.g., the sequence 400a).

In many embodiments, method 900 can comprise an activity (i.e., block) 904. In block 904, a processor can render a virtual display including each item of a second group of images according to information indicating a place of each image in a sequence. For example, a processor can render a virtual display showing images from viewpoints 302a-302h and images from viewpoints 304a-304h according to sequence information read from each image.

Figure 10:
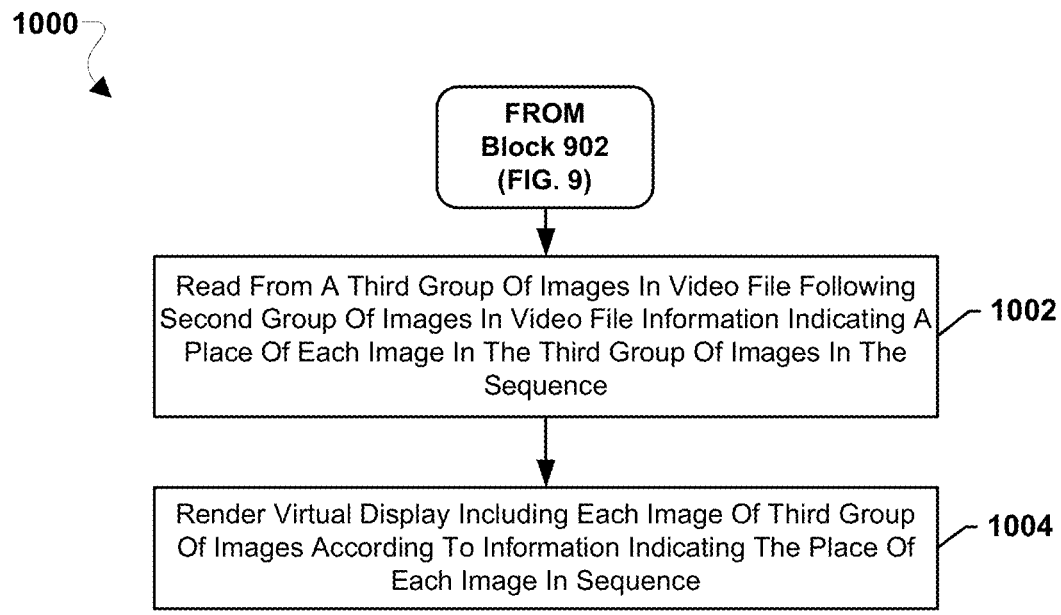
FIG. 10 is a process flow diagram illustrating operations that can be performed as part of the method for generating a virtual display of an item according to various embodiments.

FIG. 10 is a process flow diagram illustrating operations 1000 that can be performed as part of method 800 (FIG. 8) for generating a virtual display of an item according to various embodiments. Method 1000 is merely exemplary and is not limited to the embodiments presented herein. Method 1000 can be employed in many different embodiments or examples not specifically depicted or described herein. In some embodiments, activities (i.e., blocks) of method 1000 can be performed in the order presented. In other embodiments, the activities of method 1000 can be performed in any suitable order. In still other embodiments, one or more of the activities of method 1000 can be combined or skipped. With reference to FIGS. 1-10, the operations 1000 can be implemented by a processor of a computing device (e.g., buyer computing device 102 and/or another suitable controller or processor). In these or other embodiments, one or more of the activities of method 1000 can be implemented as one or more computer instructions configured to run at one or more processing modules and configured to be stored at one or more non-transitory memory storage modules.

In many embodiments, method 1000 can comprise an activity (i.e., block) 1002. In various embodiments, block 1002 can be performed after block 902 (FIG. 9). In these or other embodiments, a processor can read information indicating a place of each image in a third group of images in a sequence from a third group of images in a video file following a second group of images in the video file. For example, a processor can read information from each image (e.g., images from viewpoints 306a-306p) in a third group of images (e.g., third group 406) indicating a place of each image in a sequence (e.g., sequence 400a).

In many embodiments, method 1000 can comprise an activity (i.e., block) 1004. In block 1004, a processor can render a virtual display including each image of a second group of images according to information indicating a place of each image in a sequence. For example, a processor can render a virtual display showing images from the viewpoints 302a-302h, images from the viewpoints 304a-304h, and/or images from the viewpoints 306a-306p according to sequence information read from each image.

Figure 11:
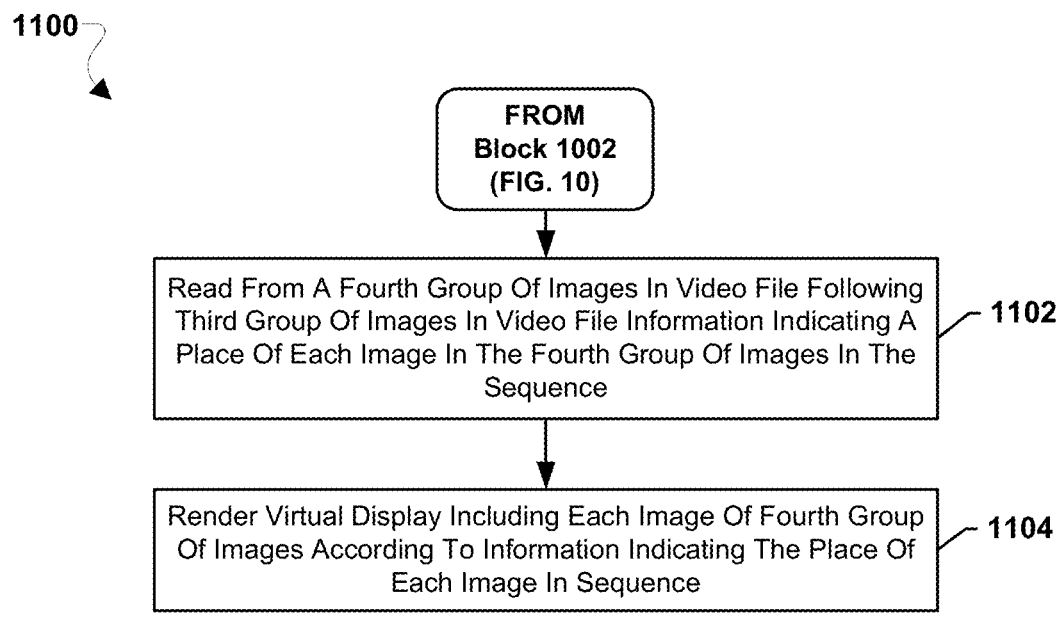
FIG. 11 is a process flow diagram illustrating operations that can be performed as part of the method for generating a virtual display of an item according to various embodiments.

FIG. 11 is a process flow diagram illustrating operations 1100 that can be performed as part of the method 800 (FIG. 8) for generating a virtual display of an item according to various embodiments. Method 1100 is merely exemplary and is not limited to the embodiments presented herein. Method 1100 can be employed in many different embodiments or examples not specifically depicted or described herein. In some embodiments, activities (i.e., blocks) of method 1100 can be performed in the order presented. In other embodiments, the activities of method 1100 can be performed in any suitable order. In still other embodiments, one or more of the activities of method 1100 can be combined or skipped. With reference to FIGS. 1-11, the operations 1100 can be implemented by a processor of a computing device (e.g., buyer computing device 102 and/or another suitable controller or processor). In these or other embodiments, one or more of the activities of method 1100 can be implemented as one or more computer instructions configured to run at one or more processing modules and configured to be stored at one or more non-transitory memory storage modules.

In many embodiments, method 1100 can comprise an activity (i.e., block) 1102. In various embodiments, activity 1102 can be performed after block 1002 (FIG. 10). In these or other embodiments, a processor can read file information indicating a place of each image in a fourth group of images in a sequence from the fourth group of images in a video file following a third group of images in the video. For example, a processor can read information from each image (e.g., images from the viewpoints 308*a*-306*ff*) in a fourth group of images (e.g., fourth group 408) indicating a place of each image in a sequence (e.g., the sequence 400*a*).

In many embodiments, method 1100 can comprise an activity (i.e., block) 1104. In block 1104, a processor can render a virtual display including each item of the fourth group of images according to information indicating a place of each image in a sequence. For example, a processor can render a virtual display showing images from viewpoints 302*a*-302*h*, images from viewpoints 304*a*-304*h*, images from viewpoints 306*a*-306*p*, and images from the viewpoints 308*a*-308*ff* according to sequence information read from each image.

Figure 12:
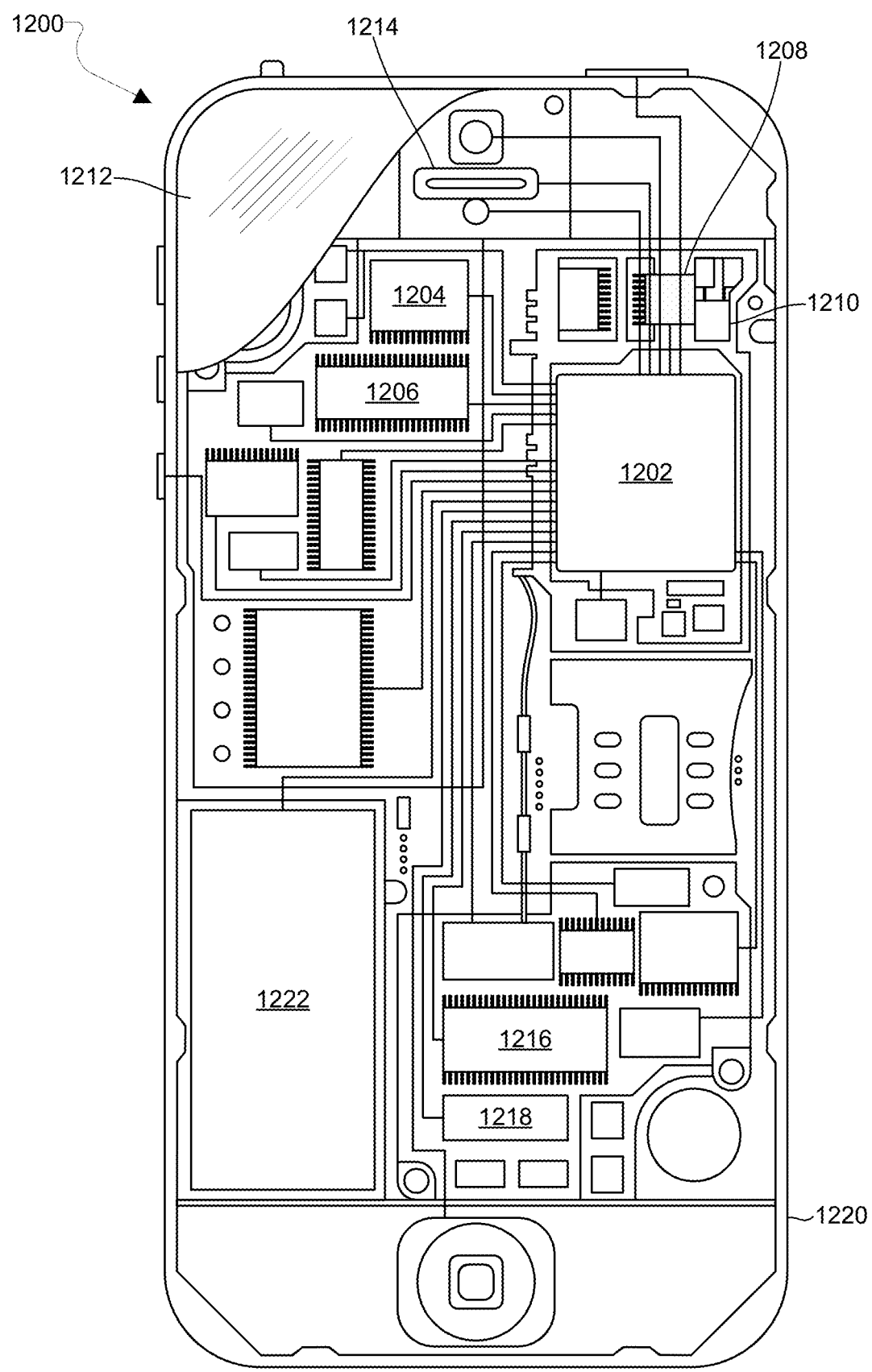
FIG. 12 is a component block diagram of a partial cross-sectional view of an example computing device suitable for use with the various embodiments.

Various embodiments can be implemented in many of a variety of computing devices, such as a mobile computing device, an example of which is illustrated in FIG. 12. For example, mobile computing device 1200 can include a processor 1202 coupled to internal memories 1204 and 1206. Internal memories 1204 and 1206 can be volatile or non-volatile memories, and can also be secure and/or encrypted memories, unsecure and/or unencrypted memories, or any combination thereof. Processor 1202 can also be coupled to a touch screen display 1212, such as a resistive-sensing touch screen, capacitive-sensing touch screen infrared sensing touch screen, or the like. Additionally, a display of mobile computing device 1200 need not have touch screen capability. Mobile computing device 1200 can have one or more radio signal transceivers 1208 (e.g., Peanut®, Bluetooth®, Zigbee®, Wi-Fi, RF radio) and antennae 1210, for sending and receiving, coupled to each other and/or to processor 1202. Mobile computing device 1200 can include a cellular network interface, such as wireless modem chip 1216, which enables communication via a cellular data network (e.g., CDMA, TDMA, GSM, PCS, 3G, 4G, LTE, or any other type of cellular data network) and is coupled to processor 1202. Mobile computing device 1200 can include a peripheral device connection interface 1218 coupled to processor 1202. Peripheral device connection interface 1218 can be singularly configured to accept one type of connection or multiply configured to accept various types of physical and communication connections, common or proprietary, such as USB, FireWire, Thunderbolt, or PCIe. Peripheral device connection interface 1218 can also be coupled to a similarly configured peripheral device connection port. Mobile computing device 1200 can also include speakers 1214 for providing audio outputs. Mobile computing device 1200 can also include a housing 1220, constructed of a plastic, metal, or a combination of materials, for containing all or some of the components discussed herein. Mobile computing device 1200 can include a power source 1222 coupled to processor 1202, such as a disposable or rechargeable battery. A rechargeable battery can also be coupled to a peripheral device connection port to receive a charging current from a source external to mobile computing device 1200.

Figure 13:
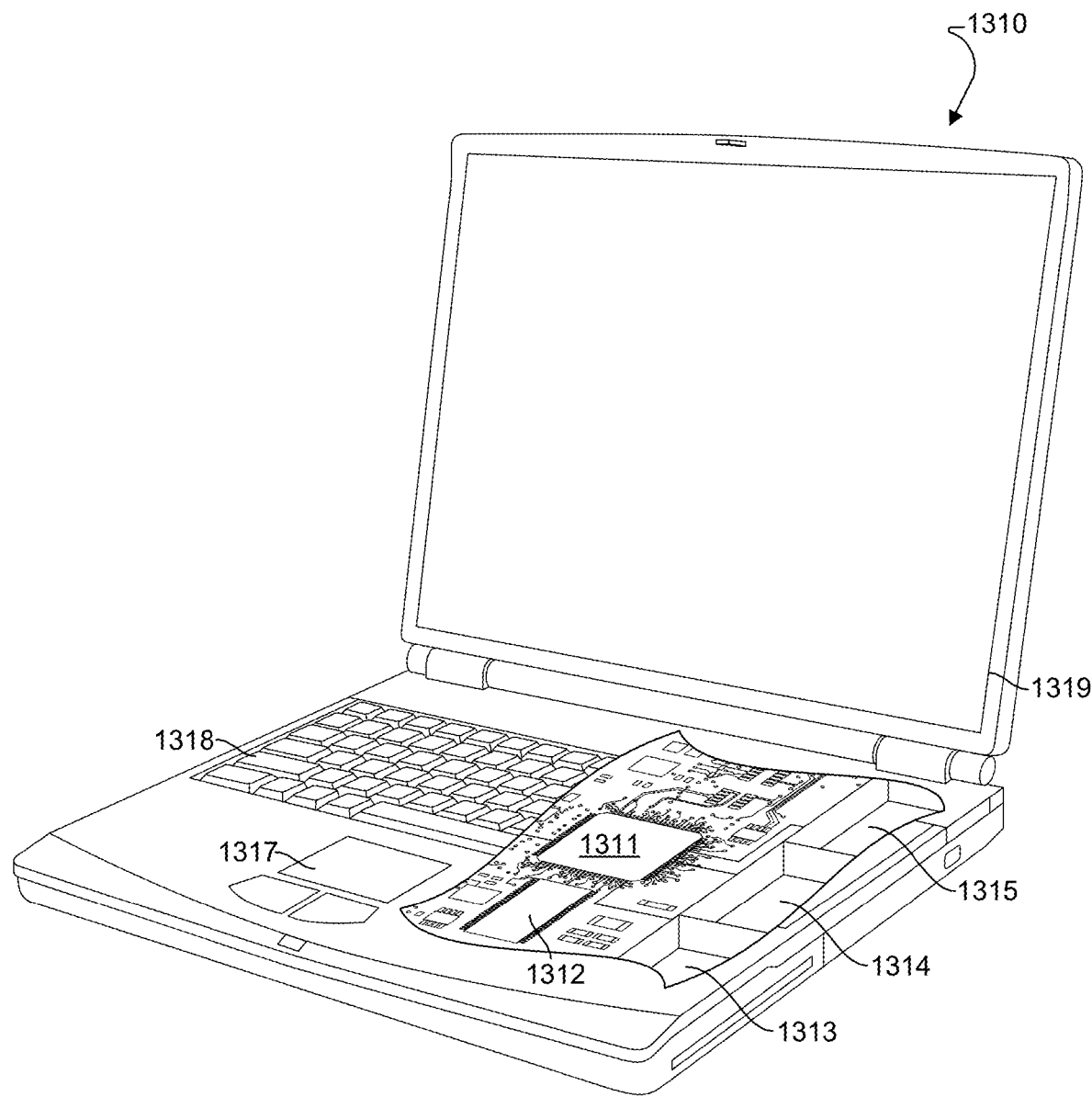
FIG. 13 is a component block diagram of a partial cross-sectional view of another example computing device suitable for use with the various embodiments.

Embodiments described above can also be implemented within a variety of computing devices, such as a laptop computer 1310 as illustrated in FIG. 13. Many laptop computers include a touch pad touch surface 1317 that serves as the computer's pointing device, and thus can receive drag, scroll, and flick gestures similar to those implemented on mobile computing devices equipped with a touch screen display and described above. Laptop computer 1310 will typically include a processor 1311 coupled to volatile memory 1312 and a large capacity nonvolatile memory, such as a disk drive 1314 of flash memory. Laptop computer 1310 can also include a floppy disc drive 1313 and a compact disc (CD) drive 1315 coupled to processor 1311. Laptop computer 1310 can also include a number of connector ports coupled to processor 1311 for establishing data connections or receiving external memory devices, such as a USB or FireWire® connector sockets or other network connection circuits (e.g., interfaces) for coupling the processor 1311 to a network. In a notebook configuration, the computer housing can include touchpad 1317, keyboard 1318, and display 1319 all coupled to processor 1311. Other configurations of the computing device can include a computer mouse or trackball coupled to the processor (e.g., via a USB input) as are well known, which can also be used in conjunction with the various embodiments.

Figure 14:
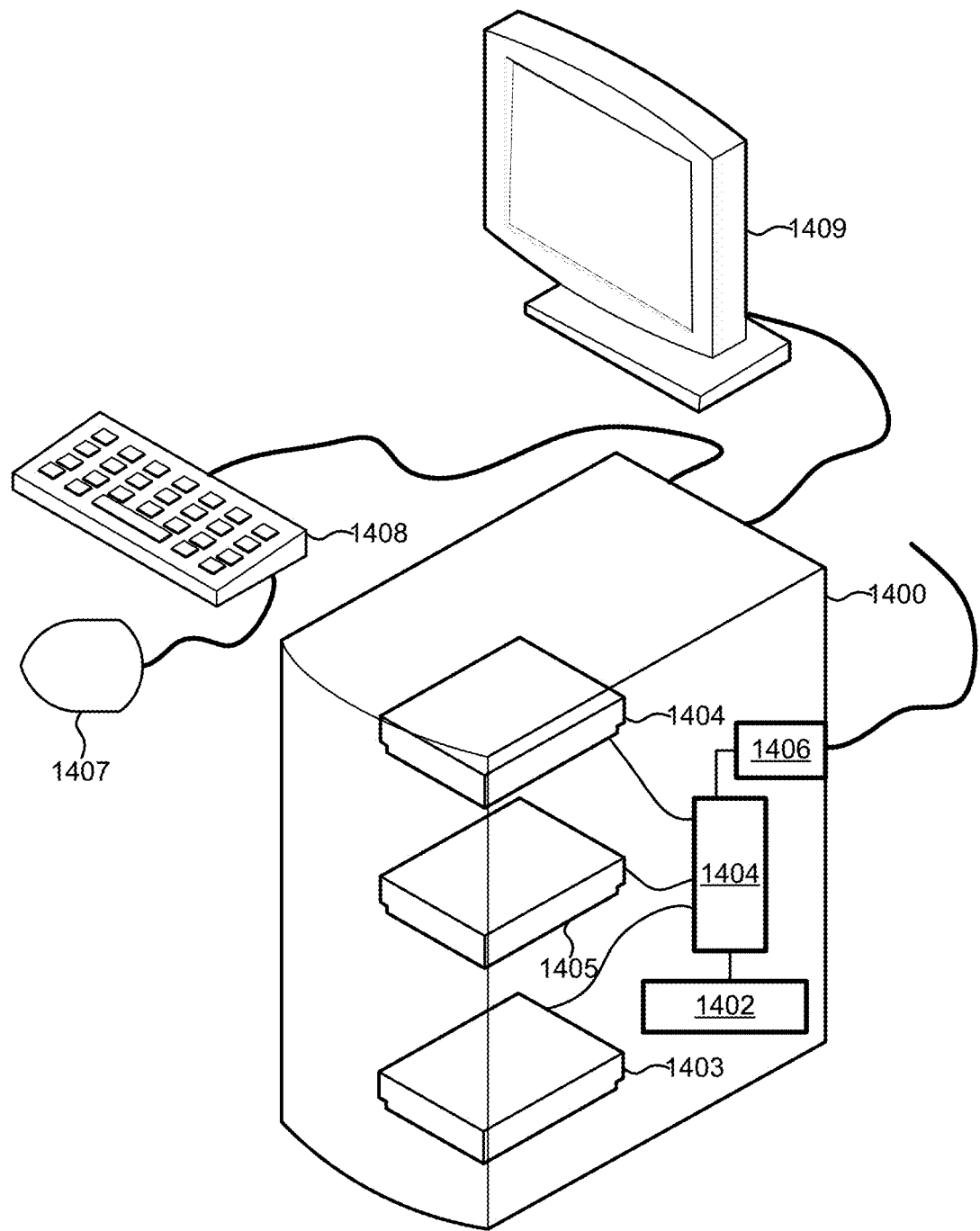
FIG. 14 is a component block diagram of another example computing device suitable of use with the various embodiments.

Various embodiments described above can also be implemented within a variety of computing devices, such as a desk top computer 1400 as illustrated in FIG. 14. A desk top computer 1400 will typically include a processor 1401 coupled to volatile memory 1402 and a large capacity nonvolatile memory, such as a disk drive 1404 of flash memory. The desk top computer 1400 can also include a floppy disc drive 1405 and a compact disc (CD) drive 1403 coupled to processor 1401. Desk top computer 1400 can also include a number of connector ports 1406 coupled to processor 1401 for establishing data connections or receiving external memory devices, such as a USB or FireWire® connector sockets or other network connection circuits (e.g., interfaces) for coupling processor 1401 to a network. Additionally, a keyboard 1408, mouse 1407, and display 1409 can all be coupled to processor 1401.

Figure 15:
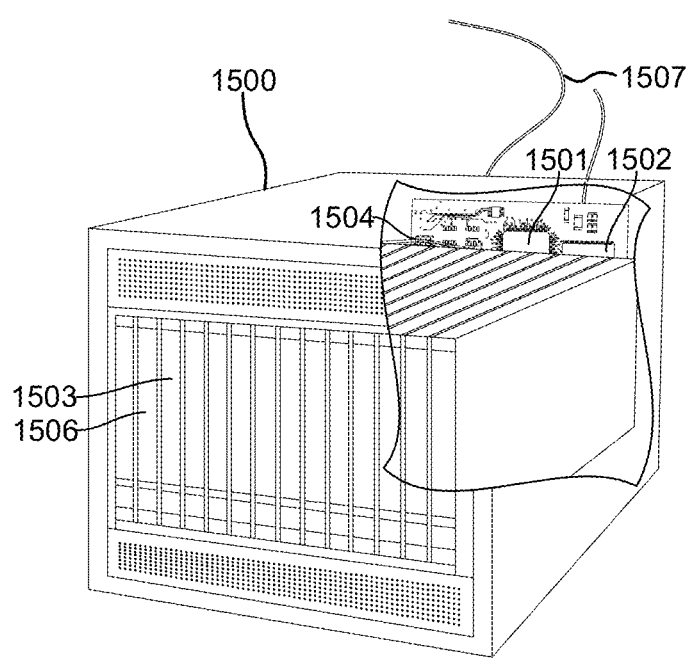
FIG. 15 is a component block diagram of a partial cross-sectional view of an example server suitable for use with the various embodiments.

Various embodiments can also be implemented on any of a variety of commercially available server devices, such as server 1500 illustrated in FIG. 15. Such a server 1500 typically includes a processor 1501 coupled to volatile memory 1502 and a large capacity nonvolatile memory, such as a disk drive 1503. The server 1500 can also include a floppy disc drive, compact disc (CD) or DVD disc drive 1506 coupled to processor 1501. Server 1500 can also include network access ports 1504 (network interfaces) coupled to processor 1501 for establishing network interface connections with a network 1507, such as a local area network coupled to other computers and servers, the Internet, the public switched telephone network, and/or a cellular data network (e.g., CDMA, TDMA, GSM, PCS, 3G, 4G, LTE, or any other type of cellular data network).

Processors 1202 (FIG. 12), 1311 (FIG. 13), 1401 (FIG. 14), and 1501 (FIG. 15) can be any programmable microprocessor, microcomputer, or multiple processor chip or chips that can be configured by software instructions (applications) to perform a variety of functions, including functions of various embodiments described above. In some devices, multiple processors can be provided, such as one processor dedicated to wireless communication functions and one processor dedicated to running other applications. Typically, software applications can be stored in internal memory 1204 (FIG. 12), 1206 (FIG. 12), 1312 (FIG. 13), 1314 (FIG. 13), 1402 (FIG. 14), 1404 (FIG. 14), 1502 (FIG. 15), and 1503 (FIG. 15) before they are accessed and loaded into processors 1202 (FIG. 12), 1311 (FIG. 13), 1401 (FIG. 14), and 1501 (FIG. 15). Processors 1202 (FIG. 12), 1311 (FIG. 13), 1401 (FIG. 14), and 1501 (FIG. 15) can include internal memory sufficient to store the application software instructions. In many devices internal memory can be a volatile or nonvolatile memory, such as flash memory, or a mixture of both. For the purposes of this description, a general reference to memory refers to memory accessible by the processors 1202 (FIG. 12), 1311 (FIG. 13), 1401 (FIG. 14), and 1501 (FIG. 15) including internal memory or removable memory plugged into a device and memory within the processor 1202 (FIG. 12), 1311 (FIG. 13), 1401 (FIG. 14), and 1501 (FIG. 15) themselves.

The foregoing method descriptions and process flow diagrams are provided merely as illustrative examples and are not intended to require or imply that the steps of the various embodiments must be performed in the order presented. As will be appreciated by one of skill in the art the order of steps in the foregoing embodiments can be performed in any order. Words such as "thereafter," "then," "next," etc. are not intended to limit the order of the steps. These words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein can be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans can implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. Alternatively, some steps or methods can be performed by circuitry that is specific to a given function.

In one or more exemplary aspects, the functions described can be implemented in hardware, software, firmware, or any combination thereof. If implemented in software, the functions can be stored as one or more instructions or code on a non-transitory computer-readable medium or non-transitory processor-readable medium. The steps of a method or algorithm disclosed herein can be embodied in a processor-executable software module which can reside on a non-transitory computer-readable or processor-readable storage medium. Non-transitory computer-readable or processor-readable storage media can be any storage media that can be accessed by a computer or a processor. By way of example but not limitation, such non-transitory computer-readable or processor-readable media can include RAM, ROM, EEPROM, FLASH memory, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm can reside as one or any combination or set of codes and/or instructions on a non-transitory processor-readable medium and/or computer-readable medium, which can be incorporated into a computer program product.

The preceding description of the disclosed embodiments is provided to enable any person skilled in the art to make or use the present invention. Various modifications to these embodiments will be readily apparent to those skilled in the art, and the generic principles defined herein can be applied to other embodiments without departing from the spirit or scope of the invention. Thus, the present invention is not intended to be limited to the embodiments shown herein but is to be accorded the widest scope consistent with the following claims and the principles and novel features disclosed herein.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   a processor; and
   a non-transitory computer-readable storage device storing computing instructions configured to run on the processor and cause the processor to perform operations comprising:
   capturing a first group of images of an item during a first rotation of the item;

capturing a second group of images of the item during a second rotation of the item;

arranging the first group of images and the second group of images in a sequence of capture, wherein the sequence of capture comprises the first group of images followed by the second group of images;

reordering the sequence of capture into a sequence for viewing, wherein the sequence for viewing comprises the second group of images interspersed among the first group of images such that, when viewed in sequence, the sequence for viewing shows an ordered rotation of the item;

converting the sequence for viewing into a video file; and coordinating displaying, on a user electronic device, a virtual display of the item comprising the video file.

2. The system of claim 1, wherein the computing instructions are further configured to run on the processor and perform operations comprising:

encoding each respective image of the first group of images and the second group of images with information indicating a respective position in the sequence of capture of each respective image of the first group of images and the second group of images; and the reordering of the sequence of capture comprises:

using the respective position in the sequence of capture of each respective image of the first group of images and the second group of images to reorder the first group of images and the second group of images into the sequence for viewing.

3. The system of claim 1, further comprising a software application configured to run on the user electronic device and perform operations comprising:

receiving the video file at the user electronic device; and coordinating displaying, on the user electronic device, the virtual display comprising images in the sequence for viewing.

4. The system of claim 1, wherein at least one of the first group of images or the second group of images comprise a group of images showing an interior of the item.

5. The system of claim 1, wherein the first group of images is taken with a different camera than the second group of images.

6. The system of claim 1, further comprising an automated photography studio configured to perform the capturing of the first group of images and the capturing of the second group of images.

7. A method comprising:

capturing a first group of images of an item during a first rotation of the item;

capturing a second group of images of the item during a second rotation of the item;

arranging the first group of images and the second group of images in a sequence of capture, wherein the sequence of capture comprises the first group of images followed by the second group of images;

reordering the sequence of capture into a sequence for viewing, wherein the sequence for viewing comprises the second group of images interspersed among the first group of images such that, when viewed in sequence, the sequence for viewing shows an ordered rotation of the item;

converting the sequence for viewing into a video file; and coordinating displaying, on a user electronic device, a virtual display of the item comprising the video file.

8. The method of claim 7, wherein the method further comprises:

encoding each respective image of the first group of images and the second group of images with information indicating a respective position in the sequence of capture of each respective image of the first group of images and the second group of images; and the reordering of the sequence of capture comprises using the respective position in the sequence of capture of each respective image of the first group of images and the second group of images to reorder the first group of images and the second group of images into the sequence for viewing.

9. The method of claim 7 further comprising providing a software application configured to run on the user electronic device and perform operations comprising:

receiving the video file at the user electronic device; and coordinating displaying, on the user electronic device, the virtual display comprising images in the sequence for viewing.

10. The method of claim 7, wherein at least one of the first group of images or the second group of images comprise a group of images showing an interior of the item.

11. The method of claim 7, wherein the first group of images is taken with a different camera than the second group of images.

12. The method of claim 7, wherein the capture of the first group of images and the capture of the second group of images is performed using an automated photography studio.

13. The system of claim 4, wherein the computing instructions are further configured to run on the processor and cause the processor to perform operations comprising, before capturing the group of images showing the interior of the item, zooming a camera out so that an entirety of the item can be seen.

14. The system of claim 1, wherein, in response to scraping from a website and being viewed by a third party, the sequence of capture displays the first group of images and the second group of images in a random order.

15. The system of claim 6, wherein the automated photography studio comprises an approximately circular structure with a turntable located at an approximate center of the automated photography studio, and wherein the turntable is configured to rotate the item.

16. The system of claim 1, wherein:

the first group of images comprise images taken at least forty-five degrees apart during the first rotation;

the second group of images comprise images taken at least forty-five degrees apart during the first rotation; and the virtual display of the item comprises a series of images taken less than forty-five degrees apart.

17. The method of claim 10, wherein the computing instructions are further configured to run on the processor and cause the processor to perform operations comprising, before capturing the group of images showing the interior of the item, zooming a camera out so that an entirety of the item can be seen.

18. The method of claim 7, wherein, in response to scraping from a website and being viewed by a third party, the sequence of capture displays the first group of images and the second group of images in a random order.

19. The system of claim 12, wherein the automated photography studio comprises an approximately circular structure with a turntable located at an approximate center of the automated photography studio, and wherein the turntable is configured to rotate the item.

20. The system of claim 7, wherein:
the first group of images comprise images taken at least forty-five degrees apart during the first rotation;
the second group of images comprise images taken at least forty-five degrees apart during the first rotation; and
the virtual display of the item comprises a series of images taken less than forty-five degrees apart.

\* \* \* \* \*